United States Patent
Lubinsky et al.

(10) Patent No.: US 12,270,958 B2
(45) Date of Patent: Apr. 8, 2025

(54) SCINTILLATING GLASS CERAMICS FOR USE IN FLAT PANEL X-RAY DETECTORS, FLAT PANEL X-RAY DETECTORS AND IMAGING SYSTEMS

(71) Applicants: THE RESEARCH FOUNDATION FOR THE STATE UNIVERSITY OF NEW YORK, Albany, NY (US); UNIVERSITY OF TENNESSEE RESEARCH FOUNDATION, Knoxville, TN (US); GEORGIA TECH RESEARCH CORPORATION, Atlanta, GA (US)

(72) Inventors: Anthony R. Lubinsky, Port Jefferson, NY (US); Adrian Howansky, Centereach, NY (US); Jacqueline Johnson, Tullahoma, TN (US); Meredith Brooke Beckert, Atlanta, GA (US); Charles Bond, Tullahoma, TN (US); Russell Lee Leonard, Tullahoma, TN (US)

(73) Assignees: THE RESEARCH FOUNDATION FOR THE STATE UNIVERSITY OF NEW YORK, Albany, NY (US); UNIVERSITY OF TENNESSEE RESEARCH FOUNDATION, Knoxville, TN (US); GEORGIA TECH RESEARCH CORPORATION, Atlanta, GA (US)

( * ) Notice: Subject to any disclaimer, the term of this patent is extended or adjusted under 35 U.S.C. 154(b) by 61 days.

(21) Appl. No.: 17/790,087

(22) PCT Filed: Jan. 22, 2021

(86) PCT No.: PCT/US2021/014786
§ 371 (c)(1),
(2) Date: Jun. 29, 2022

(87) PCT Pub. No.: WO2021/151017
PCT Pub. Date: Jul. 29, 2021

(65) Prior Publication Data
US 2023/0058622 A1    Feb. 23, 2023

Related U.S. Application Data

(60) Provisional application No. 62/965,460, filed on Jan. 24, 2020, provisional application No. 62/965,471, filed on Jan. 24, 2020.

(51) Int. Cl.
*G01T 1/20*    (2006.01)

(52) U.S. Cl.
CPC ........ *G01T 1/20188* (2020.05); *G01T 1/2002* (2013.01)

(58) Field of Classification Search
None
See application file for complete search history.

(56) References Cited

U.S. PATENT DOCUMENTS

| | | |
|---|---|---|
| 9,559,724 B2 | 1/2017 | Caillerie et al. |
| 2002/0070365 A1 | 6/2002 | Karellas |

(Continued)

FOREIGN PATENT DOCUMENTS

| | | |
|---|---|---|
| JP | 2001139942 A | 5/2001 |
| JP | 2010096616 A | 4/2010 |

(Continued)

OTHER PUBLICATIONS

International Search Report dated Jun. 22, 2021 issued in PCT/US2021/014786.

(Continued)

*Primary Examiner* — Edwin C Gunberg
(74) *Attorney, Agent, or Firm* — Scully, Scott, Murphy & Presser, P.C.

(57) ABSTRACT

Scintillating glass ceramics are disclosed. The scintillating glass ceramics may be used as an x-ray conversion layer (screen) for a flat panel imager (FPD) and as part of an imaging system. The FPD may have a single screen or a dual (Continued)

screen. The scintillating glass ceramics may be used for either a front screen or a back screen. The scintillating glass ceramics may be used for high energy x-ray applications including for energies of about 0.3 to about 20 MeV. A build-up layer may be attached to the scintillating glass ceramics for high energy applications. The scintillating glass ceramics may include a glass matrix hosting luminescent centers and light scattering centers. The materials used for the luminescent centers and light scattering centers may be the same or different. The scintillating glass ceramics may be coated onto a glass substrate.

40 Claims, 15 Drawing Sheets
(13 of 15 Drawing Sheet(s) Filed in Color)

(56) References Cited

U.S. PATENT DOCUMENTS

| | | | |
|---|---|---|---|
| 2005/0274895 A1* | 12/2005 | Jiang | C03C 10/00 250/370.11 |
| 2011/0303849 A1 | 12/2011 | Tredwell et al. | |
| 2016/0322411 A1 | 11/2016 | Elen et al. | |
| 2017/0097425 A1 | 4/2017 | Shedlock et al. | |
| 2019/0196029 A1 | 6/2019 | Ojima | |
| 2021/0063586 A1* | 3/2021 | Lubinsky | G01T 1/2008 |

FOREIGN PATENT DOCUMENTS

| | | |
|---|---|---|
| JP | 2016524135 A | 8/2016 |
| JP | 2018513364 A | 5/2018 |
| JP | 2018185237 A | 11/2018 |
| WO | 2019226859 A1 | 11/2019 |

OTHER PUBLICATIONS

Written Opinion dated Jun. 22, 2021 issued in PCT/US2021/014786.

Notice of Reasons for Rejection dated Sep. 30, 2024 received in Japanese Patent Application No. 2022-539064.

Barta, M. et al., "Composition optimization of scintillating rare-earth nanocrystals in oxide glass-ceramics for radiation spectroscopy", Appl Opt., Jun. 2014, pp. D21-D28, vol. 53, No. 16.

Extended European Search Report dated Jan. 30, 2024 received in European Patent Application No. EP 21744298.7.

* cited by examiner

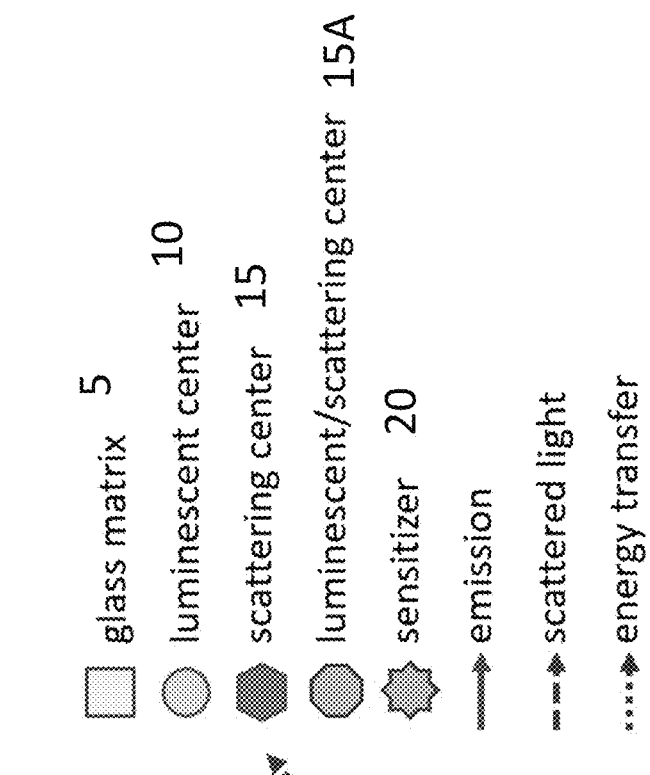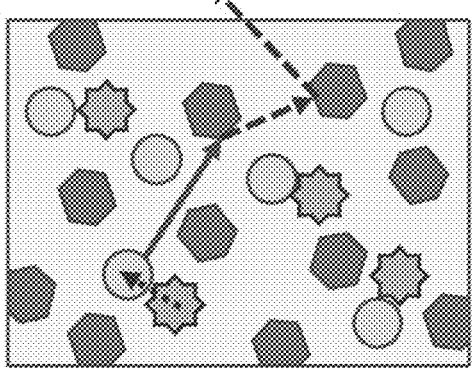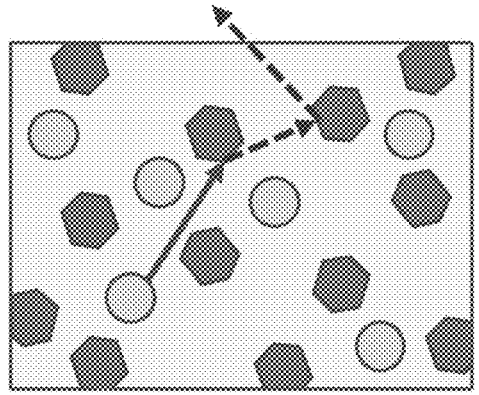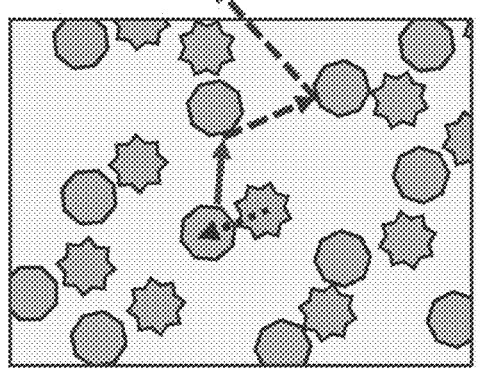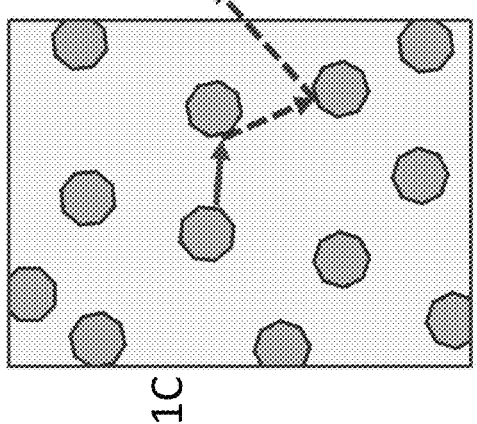

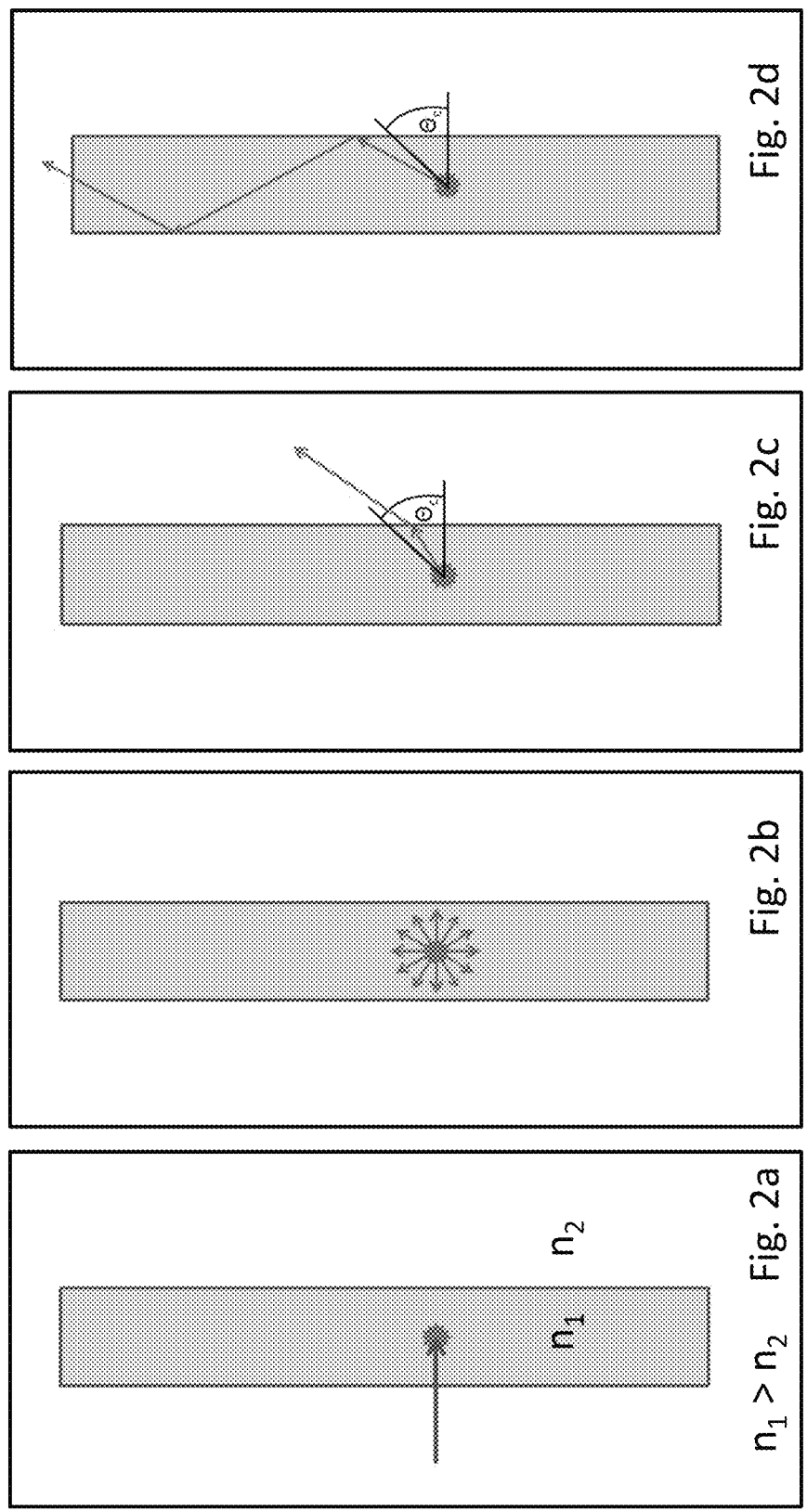

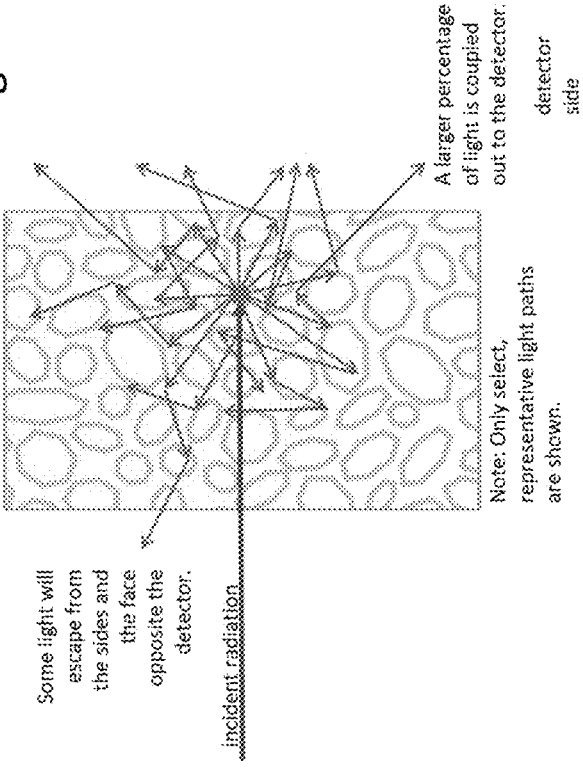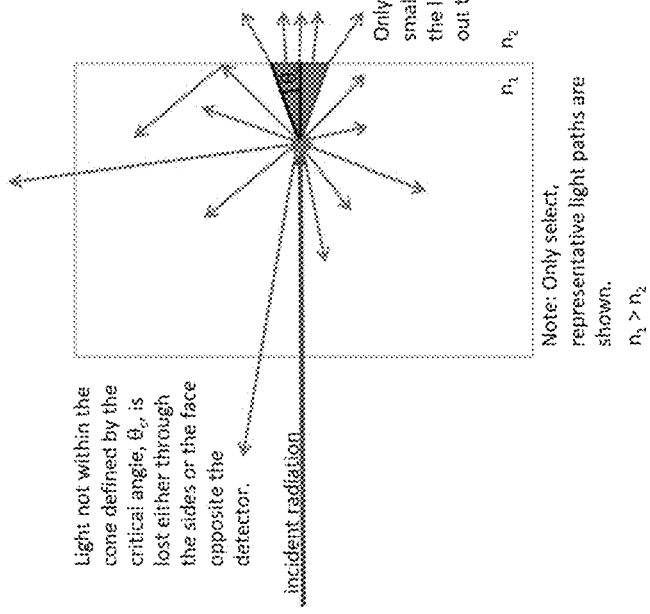

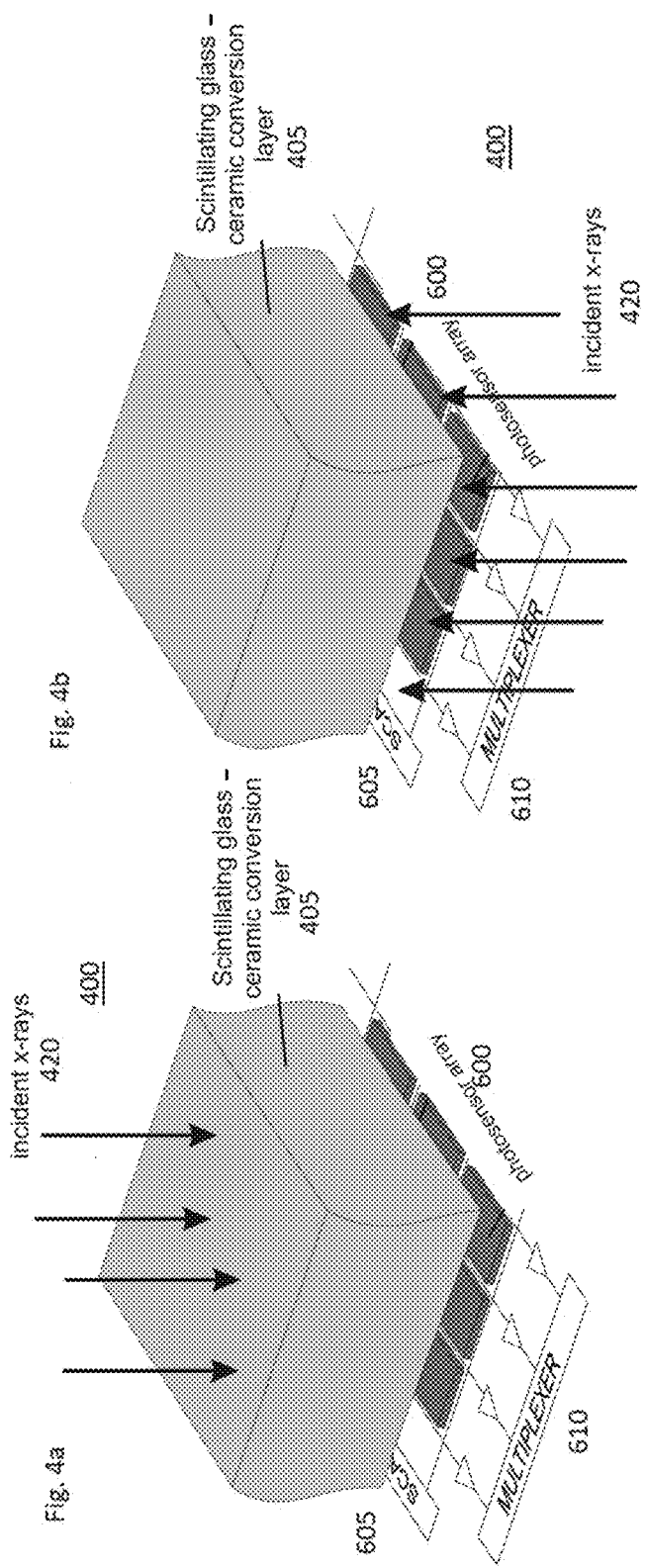

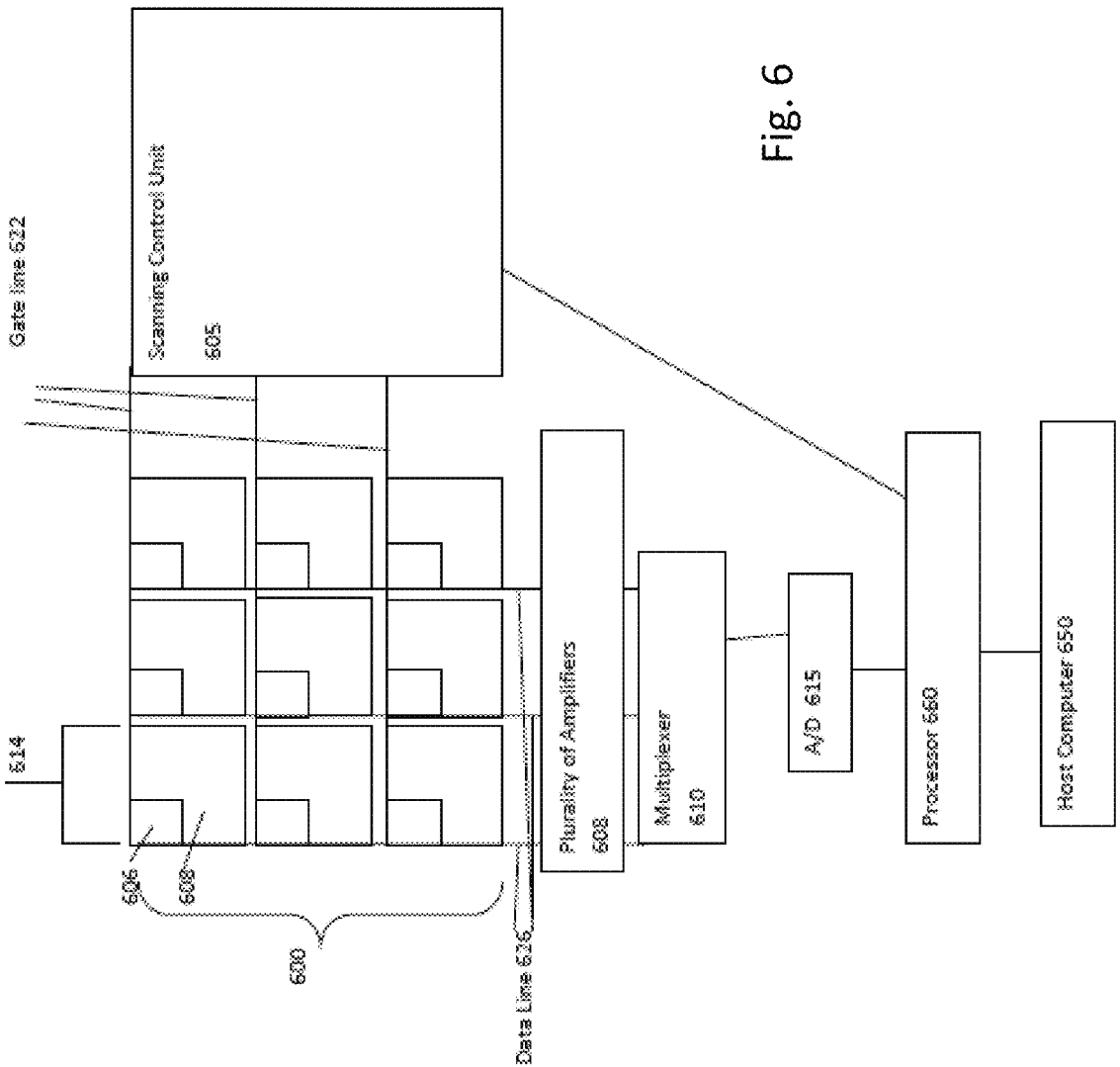

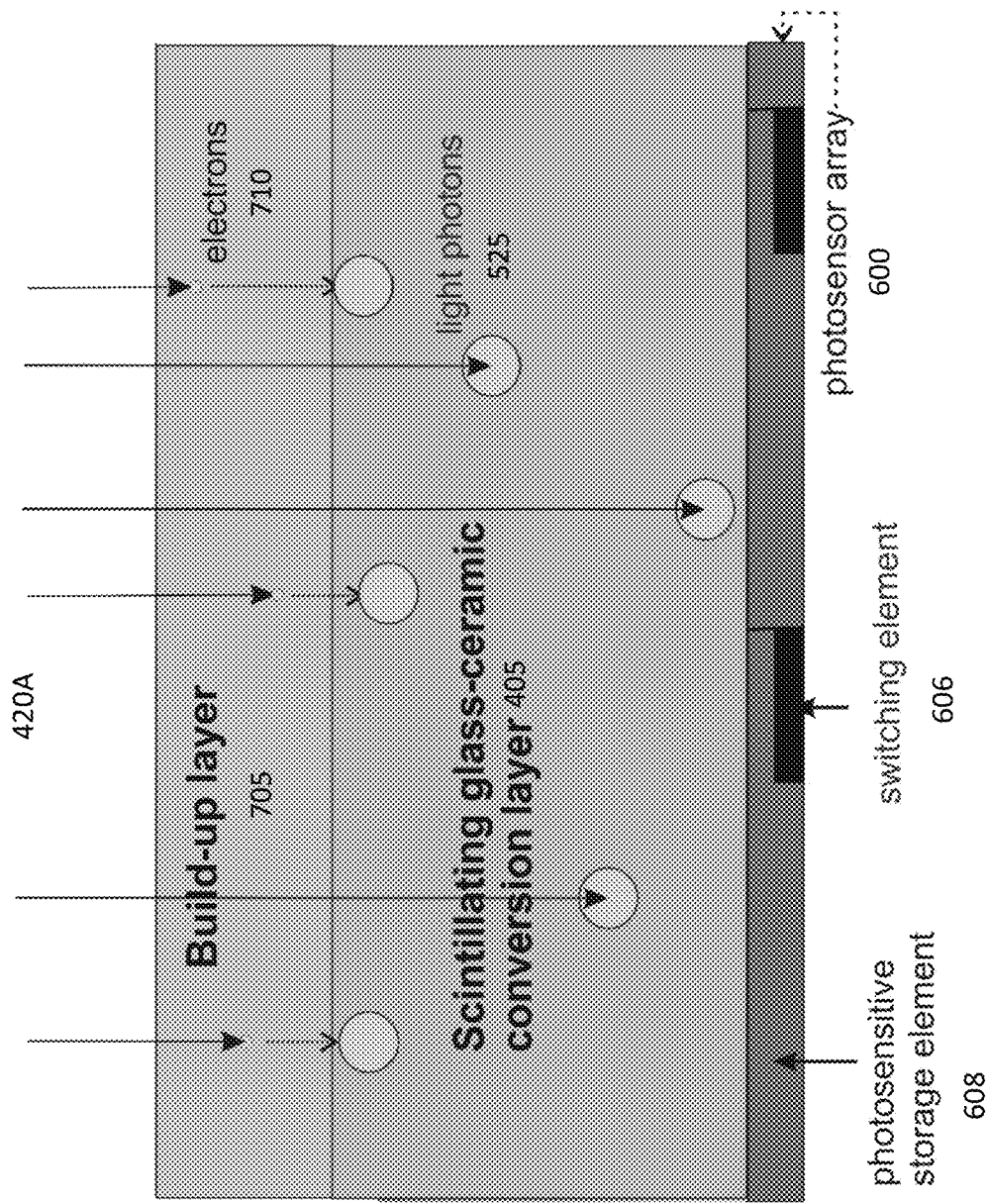

SCINTILLATING GLASS CERAMICS FOR USE IN FLAT PANEL X-RAY DETECTORS, FLAT PANEL X-RAY DETECTORS AND IMAGING SYSTEMS

CROSS REFERENCE TO RELATED APPLICATIONS

This application claims the benefit of U.S. Provisional Application No. 62/965,460 and U.S. Provisional Application No. 62/965,471 filed on Jan. 24, 2020, the content of which are incorporated herein by reference.

STATEMENT REGARDING FEDERALLY SPONSORED RESEARCH AND DEVELOPMENT

This invention was made with government support under C140151 awarded by the National Institutes of Health and DMR 1600783 awarded by the National Science Foundation. The government has certain rights in the invention.

FIELD OF THE DISCLOSURE

The present application relates generally to structures and materials for radiation detectors, radiation detection and digital radiography.

BACKGROUND

Flat panel detectors (FPD) have been used for digital x-ray imaging devices. For example, "indirect" FPDs form x-ray images by detecting the incoming spatial distribution of x-rays using a scintillating screen, i.e., an x-ray conversion layer, combined with a 2D photosensor array. Known FPDs may use a single screen in either a front illuminated (FI) mode in which the incoming x-rays pass first through the scintillating screen, or in a back illuminated (BI) mode, in which the x-rays pass first through the photosensor array. However, a large fraction of the incident x-ray beam passes through the screen undetected. Increasing the thickness of the single scintillating layer is not a viable solution because the image quality would then suffer from excessive spatial blur.

PCT Publication WO2019/226859 describes a dual-screen sandwich configuration, in which the back screen is a scintillating glass which serves the dual purpose of acting as a substrate for the 2D photosensor array, and also as an x-ray conversion layer for those x-rays which pass through the front screen undetected.

SUMMARY

Disclosed is a structure comprising a photosensor array and a screen comprising a scintillating glass ceramic. The scintillating glass ceramic comprises a glass matrix hosting luminescent centers and light scattering centers. The scintillating glass ceramic is configured to convert incident x-ray radiation into light photons. A surface of the scintillating glass ceramic faces the photosensor array. The photosensor array is operable to capture at least a portion of the light photons from the screen and convert the captured light photons into electrical signals.

In an aspect of the disclosure, the scintillating glass ceramic may be a substrate for the photosensor array.

In an aspect of the disclosure, the scintillating glass ceramic may be configured to convert incident x-ray radiation incident on the surface of the scintillating glass ceramic facing the photosensor array and/or a surface of the scintillating glass ceramic opposite the surface facing the photosensor array, such that the structure may be operated in front illuminated (FI) mode and/or in back illuminated (BI) mode.

In an aspect of the disclosure, the light scattering centers may include crystals of a same composition or a combination of crystals having different compositions. In an aspect of the disclosure, the luminescent centers may include crystals of a same composition or a combination of crystals having different compositions.

In an aspect of the disclosure, the crystals of the luminescent centers may be doped with an activator.

In an aspect of the disclosure, the crystals may be halide crystals.

Additionally or alternatively, the luminescent centers may include one or more materials selected from a group consisting of ions from the first and second row of transition metals, rare earth metals, actinides and $ns^2$ type activators.

In an aspect of the disclosure, the luminescent centers may be $Tb^{3+}$ and the scintillating glass ceramic may comprise $Tb_2O_3$. The percentage of the $Tb_2O_3$ may be varied as needed for an application, and be, for example, about 6%.

In an aspect of the disclosure, the scintillating glass ceramic may further comprise sensitizers. The sensitizers may be one or more materials selected from a group consisting of $ns^2$ type and lanthanide ions. In an aspect of the disclosure, the sensitizers may be $Gd^{3+}$ and/or $Ce^{3+}$.

In an aspect of the disclosure, the glass matrix may be an oxyhalide matrix.

In an aspect of the disclosure, the structure may further comprise a build-up layer positioned on a surface of the scintillating glass ceramic opposite the surface facing the photosensor array. The build-up layer may comprise a material selected from a group consisting of copper, brass, lead and leaded glass. In an aspect of the disclosure, the incident x-ray radiation may have energy of about 0.3 to about 20 MeV.

Also disclosed is a structure having two screens. The structure comprises a first scintillating screen, a photosensor array and a second scintillating screen comprising a scintillating glass ceramic. The first scintillating screen converts an absorbed portion of incident radiation directed at the structure into light photons. The photosensor array is between the first scintillating screen and the second scintillating screen. The scintillating glass ceramic comprises a glass matrix hosting luminescent centers and light scattering centers. The scintillating glass ceramic is configured to convert at least a portion of the incident radiation transmitted through the first scintillating screen and the photosensor array into light photons. The photosensor array is operable to capture at least a portion of the light photons from the first scintillating screen and the second scintillating screen and convert the captured light photons into electrical signals.

In an aspect of the disclosure, the second scintillating screen may further comprise a backing where the backing contacts another surface of the scintillating glass ceramic. The surface in contact with the backing is a surface opposite of a surface facing the photosensor array. The backing may have optical proprieties including being absorptive or reflective to the light photons.

In an aspect of the disclosure, the scintillating glass ceramic of the second scintillating screen may be a substrate for the photosensor array.

In an aspect of the disclosure, the scintillating glass ceramic of the second scintillating screen may have different thicknesses depending of the application and whether it is used as the substrate. In an aspect of the disclosure, the scintillating glass ceramic may have a thickness of greater than about 0.5 mm.

In an aspect of the disclosure, the light scattering centers in the scintillating glass ceramic of the second scintillating screen may include crystals of a same composition or a combination of crystals having different compositions. In an aspect of the disclosure, the luminescent centers in the scintillating glass ceramic of the second scintillating screen may include crystals of a same composition or a combination of crystals having different compositions. In an aspect of the disclosure, the crystals of the luminescent centers in the scintillating glass ceramic of the second scintillating screen may doped with an activator. In an aspect of the disclosure, the crystals may be halide crystals.

Additionally or alternatively, the luminescent centers in the scintillating glass ceramic of the second scintillating screen may include one or more materials selected from a group consisting of ions from the first and second row of transition metals, rare earth metals, actinides and $ns^2$ type activators. In an aspect of the disclosure, the luminescent centers may be $Tb^{3+}$ and the scintillating glass ceramic comprises $Tb_2O_3$. The percentage of the $Tb_2O_3$ may be varied as needed for an application, and be, for example, about 6%.

In an aspect of the disclosure, the scintillating glass ceramic of the second scintillating screen may further comprise sensitizers. The sensitizers may be one or more materials selected from a group consisting of $ns^2$ type and lanthanide ions. In an aspect of the disclosure, the sensitizers may be $Gd^{3+}$ and/or $Ce^{3+}$.

In an aspect of the disclosure, the glass matrix for the second scintillating screen may be an oxyhalide matrix.

Also disclosed is a scintillating glass ceramic for x-ray conversion comprising a glass matrix hosting luminescent centers, light scattering centers, and one or more high-Z elements.

The scintillating glass ceramic may be used in many different configuration and other imaging applications like MeV imaging.

In an aspect of the disclosure, the light scattering centers may have a size greater than about 10 nm. In an aspect of the disclosure, a concentration of light scattering centers in the glass matrix may be such that a scattering length is greater than about 1 μm.

In an aspect of the disclosure, the scintillating glass ceramic may have a density greater than about 3.0 g·cm$^{-3}$.

In an aspect of the disclosure, photon emissions may be in a wavelength range from about 375 nm to about 650 nm. In an aspect of the disclosure, a wavelength of the photon emissions may be based on the application and the photosensor array used.

In an aspect of the disclosure, the one or more high-Z elements may be sensitizers. Alternatively or additionally, scintillating glass ceramic may further comprise separate sensitizers, where the sensitizers may be one or more materials selected from a group consisting of $ns^2$ type and lanthanide ions.

In an aspect of the disclosure, the light scattering centers may include crystals of a same composition or a combination of crystals having different compositions.

In an aspect of the disclosure, the glass matrix of the ceramic may be an oxyhalide matrix.

Also disclosed is another structure having two screens. The structure comprises a first scintillating screen, a photosensor array and a second scintillating screen comprising a scintillating glass ceramic and a glass substrate. The scintillating glass ceramic may be a coating on the glass substrate. The photosensor array is between the first scintillating screen and the second scintillating screen. The scintillating glass ceramic comprises a glass matrix hosting luminescent centers and light scattering centers. The scintillating glass ceramic is configured to convert at least a portion of the incident radiation transmitted through the first scintillating screen and the photosensor array into light photons. The photosensor array is operable to capture at least a portion of the light photons from the first scintillating screen and the second scintillating screen and convert the captured light photons into electrical signals.

In an aspect of the disclosure, the structure may further comprise a glass film coated on the scintillating glass ceramic. The glass film may be a substrate for the photosensor array.

In an aspect of the disclosure, the luminescent centers and the light scattering centers may include crystals. The crystals may be selected from a group consisting of halide crystals, silicate crystals, sulfide crystals, or other crystals. In an aspect of the disclosure, the crystal may be doped.

Also disclosed is an imaging system comprising a processor configured to be in communication with a structure as described above and the photosensor array is configured to produce an image having a plurality of pixels. In this aspect, the processor may be configured to receive the electrical signals from the structure; and produce the image having the plurality of pixels using the electrical signals.

BRIEF DESCRIPTION OF THE DRAWINGS

The patent or application file contains at least one drawing executed in color. Copies of this paper or patent application publication with color drawing(s) will be provided by the Office upon request and payment of the necessary fee.

FIG. 1a illustrates a diagram of an example of a scintillating glass ceramic in accordance with aspects of the disclosure;

FIG. 1b illustrates a diagram of another example of a scintillating glass ceramic in accordance with aspects of the disclosure;

FIG. 1c illustrates a diagram of another example of a scintillating glass ceramic in accordance with aspects of the disclosure;

FIG. 1d illustrates a diagram of another example of a scintillating glass ceramic in accordance with aspects of the disclosure;

FIGS. 2a-d illustrate a progression of a scintillating event within a non-scattering scintillating medium, where FIG. 2a illustrates an incident radiation triggering a scintillation event, FIG. 2b illustrates the resultant emission which is omnidirectional, FIG. 2c illustrates photons that reach an interface between the non-scattering scintillating medium and an external medium at an angle less than the critical angle can exit, and FIG. 2d illustrates photons that reach the interface at an angle greater than the critical angle are reflected internally and become "trapped" and exit at the sides of the non-scattering scintillating medium;

FIGS. 3a and 3b illustrate a comparison between scintillating media, where FIG. 3a shows a medium with scattering and FIG. 3b shows a transparent medium without scattering;

FIG. 4a illustrates a single screen structure having a scintillating glass ceramic used as the x-ray conversion layer in an indirect flat panel x-ray detector in accordance with aspects of the disclosure in front illuminated (FI) mode;

FIG. 4b illustrates a single screen structure having a scintillating glass ceramic used as the x-ray conversion layer in an indirect flat panel x-ray detector in accordance with aspects of the disclosure in back illuminated (BI) mode;

FIG. 6 is a schematic view showing an photosensor array and certain control components in accordance with aspects of the disclosure;

FIG. 7 illustrates schematic cross-sectional view of another single screen structure having a scintillating glass-ceramic conversion layer used in a detector for high energy photons in accordance with aspects of the disclosure;

DETAILED DESCRIPTION

In accordance with aspects of the disclosure, a scintillating glass ceramic 1A may be comprised of a glass matrix 5 which contains both luminescent centers 10 and light scattering centers 15. The term glass ceramic used herein refers to a composite material containing at least one amorphous and one crystalline phase. The glass matrix 5 hosts both luminescent centers 10 and light scattering centers 15. The glass matrix 5 remains stable, without undergoing unwanted devitrification, while hosting both the luminescent centers 10 and light scattering centers 15. The glass matrix 5 is also stable under the expected operating conditions including, but not limited to, use in a flat panel imaging system. The glass matrix may also have a composition containing desired precursor crystalline elements that is thermally stable enough to precipitate crystallites. In the figures (e.g., FIG. 1a), the luminescent centers 10 are shown with green circles and the scattering centers 15 are shown with blue hexagons. However, the shape and color of the depiction is for illustration purposes only and the shape of the elements may be different in the glass matrix 5. Also the size of the luminescent centers 10 and light scattering centers 15 shown in the figures are just illustrative. Further, the size and color of the glass matrix 5 (light blue) are also for illustration purposes only.

In accordance with aspects of the disclosure, the glass matrix 5 has a high degree of transparency at the emitted wavelengths to prevent self-absorption. A low phonon energy matrix is preferred to increase scintillation efficiency by reducing nonradiative return via multi-phonon energy transfer. In some aspects of the disclosure, the scintillating glass ceramic 1A may also serve as a substrate for the FPD electronics such as the photosensor array 600. In accordance with this aspect, the scintillating glass ceramic 1A may have necessary thermal and mechanical properties, such as, but not limited to, glass transition temperature, crystallization temperature, melting point, elastic modulus, strength, hardness, and impact resistance. The glass matrix 5 may be based on systems such as halides, oxides, oxyhalide, borates, tellurides, chalcogenides, phosphates, germanates, silicates, fluorosilicates, aluminosilicates, β-Quartz, β-spodumenephosphate, cordierite, and others.

Figure 16:
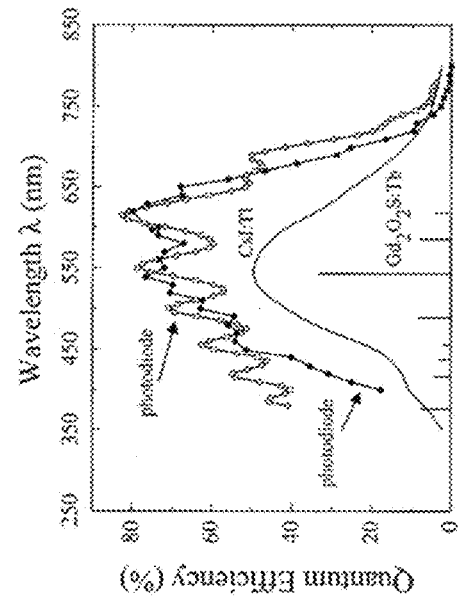
FIG. 16 illustrates the quantum efficiencies of two known photodiodes.

The term luminescent centers used herein refer to an intentional imperfection in a material, added in a controlled manner, which gives rise to luminescence when excited by appropriate radiation. Luminescent centers may also be referred to as activators herein (intentionally added to a glass matrix or crystal). The luminescent centers 10 may be elements, ions, or compounds which convert incident radiation into light that can be easily detected by the FPD (UV, visible, and/or infrared). In some aspects of the disclosure, the emission spectrum of the luminescent centers 10 may match the quantum efficiency curve of the photosensitive array 600 for increased efficiency. FIG. 16 shows a quantum efficiency curve of known photosensor arrays 600.

There are many items or combinations of items that could serve as luminescent centers including ions from the first and second row of the transition metals (Z=22-30, and 40-48), the rare earth metals (Z=21, 39, and 57-71), the actinides (Z=89-103) or $ns^2$ type activators (Z=31, 32, 49-51, 79, and 81-83). Crystalline materials may also serve as the source of emission (luminescent centers). The crystals may be either intrinsic or extrinsic scintillators. A combination of scintillating crystals and other materials may also be used for improved light output.

As described above, the glass matrix 5 includes light scattering centers 15 in addition to luminescent centers 10. The term light scattering centers used herein refers to an intentional imperfection in a transparent material, added in a controlled manner, which results in the elastic scattering of light. The inventors have realized that using both luminescent centers 10 and light scattering centers 15 improves detection efficiency for an imaging system and performance in both a single screen configuration and a dual screen configuration.

The inventors have realized that light scattering centers 15 within the glass matrix 5 are key to preventing "light trapping" of the emission in imaging systems. During a scintillation event which is triggered by a source (FIG. 2a), the light that is emitted is omnidirectional (FIG. 2b). Therefore a significant portion of the light will be incident at an interface between a scintillating medium and an external medium at an angle greater than the critical angle resulting in total internal reflection (TIR) i.e. light trapping. The "trapped" light will exit the sides of the scintillating medium, or be self-absorbed, without being detected, greatly reducing the efficiency of the scintillator/detector system. The critical angle is defined by the following equation $$\theta_c = \sin^{-1}\left(\frac{n_2}{n_1}\right) \quad (1)$$

where $n_1$ is the refractive index of the scintillator medium and $n_2$ is the refractive index of the external medium.

However, in accordance with aspects of the disclosure, the presence of light scattering centers 15 in the glass matrix 5 will lead to a reduction in this "trapping" effect for increased efficiency. The light scattering centers 15 in the glass matrix 5 will redirect emission until it can escape the scintillator glass ceramic 1A and be detected by the photosensor array 600 or absorbed internally or by a backing layer; some photons may be self-absorbed within the glass matrix 5, which is why a transparent matrix is desirable. Crystals may also be light scattering centers 15.

Some examples of crystals that may be precipitated within an oxyhalide matrix, or other glass systems, include the following: $PbWO_4$, $Yb_2TeO_6$, $PbTeO_4$, $TeO_2$, $CdF_3$, $PbF_2$, $BaF_2$, $BaCl_2$, $BaI_2$, BaBr2, $CaF_2$, $SrCl_2$, $LaF_3$, Na, $YF_4$, $YLiF_4$, $GdF_3$, and $TbF_3$. However, additional oxide, halide, or other types of crystals may be used in the glass matrix 5 (or a combination of different types of crystals may be used). The chemicals, either chemical composition or quantity, required for synthesis should not be detrimental to the formation of precursor glass, i.e. must allow glass formation and not facilitate unwanted crystallization. Oxyhalide glass ceramics also can have a high degree of transparency depending upon crystallite size, which can be controlled via heat treatment parameters. In an aspect of the disclosure, the crystals should be of a size large enough to enable light scattering at the scintillation emission wavelengths, but not so high in concentration as to reduce the scattering length to a level which reduces the number of escaped photons due to self-absorption. In some aspects of the disclosure, the crystals may be larger than about 10 nm. In some aspects of the disclosure, the size of the crystals may be a function of the scintillation emission wavelengths. In some aspects of the disclosure, the level may be greater than about 1 μm.

FIGS. 3a and 3b show the difference in the amount of light making it to the detector (photosensor array 600) in a scattering material versus a transparent material. FIG. 3a shows light paths within a scattering scintillating medium whereas FIG. 3b shows a transparent non-scattering scintillator. A larger percentage of the emission is coupled out to the detector with the scattering scintillator. In the figures, the light paths are shown with arrows. The incident radiation is shown with the longer arrow. The detector (photosensor array 600) is on the opposite side of the incident radiation.

In another aspect of the disclosure, the scintillating glass ceramic 1B may also comprise sensitizers 20 as shown in FIG. 1b. The term sensitizer used herein refers to an ion that is capable of transferring its excitation energy to a neighboring activator inducing an excited state, resulting in luminescence. The presence of a sensitizer may greatly improve luminescent efficiency. The sensitizer 20 is shown in FIG. 1b in red stars. However, the depiction is just for illustration and the shape and color of the sensitizers 20 may be different. Additionally, the size of the sensitizers 20 in FIG. 1b is for illustrative purposes only. Sensitizers 20 increase scintillation efficiency via energy transfer to the luminescent centers 10. The energy transfer is shown in FIG. 1b with a dotted arrow (red). In an aspect of the disclosure, the sensitizers 20 may be $ns^2$ ions such $Sb^{3+}$ and $Bi^{3+}$, lanthanides such as $Ce^{3+}$, $Pr^{3+}$, $Eu^{2+}$, $Gd^{3+}$, $Tm^{3+}$, and $Yb^{3+}$, or other ions capable of transferring energy from an excited state to an activator. In addition, the careful selection of sensitizers may increase the x-ray absorption of the material for increased scintillation efficiency, through increased density and increased average atomic number.

A combination of different sensitizing items may be used. The ions, in the form in which they are added to the composition, should not be detrimental to the formation of precursor glass, i.e. must allow glass formation and not facilitate unwanted crystallization, which could unfavorably alter the scintillator's transparency and/or negatively affect the efficiency of the luminescent centers.

In another aspect of the disclosure, the same integrant may serve as both luminescent centers 10 and light scattering centers 15 in the scintillating glass ceramic 1C as shown in FIG. 1c. Crystals may be either intrinsic or extrinsic scintillator materials. For example, halide crystals may be used as both luminescent centers 10 and light scattering centers 15 in ceramics used in x-ray conversion. There is a strong affinity of rare earth ions for halide anions, so that they may be easily incorporated as an activator material. The low phonon energy of the halide crystals makes for an efficient host for improved scintillation efficiency.

The luminescent/scattering centers 15A are shown in FIG. 1c as purple octagons. However, the depiction is just for illustration and the shape and color of the luminescent/scattering centers 15A may be different. Additionally, the size of the luminescent/scattering centers 15A in FIG. 1c is for illustrative purposes only. The emission is shown with a green arrow and the scattered light is shown with a blue dashed arrow. For example, certain crystals such as the halide crystals described above, which may or may not be doped with an activator, such as $Eu^{2+}$, may serve as both scattering centers and luminescent centers, for example $BaCl_2:Eu^{2+}$ and $BaCl_2$; other, non-halide crystals, such $Y_3Al_5O_{12}$, $Zn_2SiO_4$, $PbWO_4$ could also serve as both luminescent and scatterings centers.

Sensitizers 20 may also be used with the luminescent/scattering centers in the scintillating glass ceramic 1D as shown in FIG. 1d.

In an aspect of the disclosure, the scintillating glass ceramic 1 has sufficient density such as about 3.0 g·cm$^{-3}$ and appropriate elemental composition to allow efficient absorption of incident radiation. The composition of the scintillating glass ceramic 1 may be tuned for the specific type of incident radiation. In other aspects of the disclosure, the glass matrix 5 also has a high-Z element. A high-Z element used herein refers to any element with an atomic number greater than or equal to 64.

FIG. 4a shows an example of a Flat Panel Detector (FPD) 400 (an example of a structure) having any of the scintillating glass ceramics (collectively referred herein using "1") as a conversion layer (the scintillating glass-ceramic conversion layer will be referred to herein using "405"). A photosensor array 600 which includes a photodiode 608 (also referred to herein photosensitive storage elements) and TFT 606 (also referred to herein as switching elements) are on the opposite side of the source (not shown) of the x-ray 420. The FPD 400 in FIG. 4a is in front illuminated (FI) mode.

The photosensitive storage elements 608 produce an electrical signal (charge) in response to light photons. The photosensor array 600 may be placed in intimate contact with a scintillating glass-ceramic conversion layer 405 which absorbs x-rays 420 and produces light.

The electrical signal is proportional to the sum of all the light photons (that reach the respective photosensitive storage element from the scintillating glass ceramic layer 405 and are absorbed in the photosensitive elements). The photosensitive storage elements 608 may be a-Si:H photodiodes, MIS-type sensors, or other sensor types known in the art. The switching elements 106 may be thin film transistor (TFT) elements of the a-Si:H type, metal oxide (MOTFT) types, or other types known in the art. Each switching element 606 corresponds to a photosensitive storage element 608. Each switching element 606 is used to readout the electrical signal from the corresponding storage element 608.

The photosensor array 600 may also include additional layers (not shown in the figures), such as, but not limited to, a biasing metal layer and a metal layer on the opposite side and other layers of e.g., a photodiode (and other dielectric materials or layer).

An example of a photosensor array 600 (which is shown in FIG. 6 without the various layers) and peripheral electronics are shown in FIG. 6. The example in FIG. 6 shows a 3×3 array. Thus, in the example, there are nine pixels 614. However, the number of pixels in FIG. 6 is shown just as an example, for descriptive purposes only; any number of columns and rows of pixels may be used. The number of pixels may be based on a specific application of use for the FPD 400. As shown in FIGS. 4 and 6, a pixel includes the photosensitive storage element 608 and switching element 606. In the example, the switching element 606 is shown in the corner of the pixel 614. In other aspects of the disclosure, the switching element 606 may be in other places.

FIG. 6 shows certain components of an imaging system that are for scanning the structure and subsequently producing the image. The image has a plurality of pixels 614. As shown, a scanning control unit 605 is coupled to each row of pixels via a gate line 622. A bias voltage is applied to the photosensitive storage elements 608. A transparent metal bias layer is an example of a component used for the bias voltage. The switching elements 606 are controlled via their respective gate line 622. When a switching element 606 is turned on, it passes a charge to a respective data line 626. Each data line is connected to a plurality of charge amplifiers 608.

The plurality of charge amplifiers 608 are coupled to a multiplexer 610. The multiplexer 610 in turn is coupled to an A/D 615 (converter) which supplies an input to the processor 660. The processor 660 controls the scanning control unit 605 to turn on/off the switching element 606. The processor 660 may store the electrical signals from the storage elements/switches in the memory (not shown in FIG. 6). An image may be produced using the digital values stored in memory. The charge amplifiers 608 are typically implemented in custom ASIC chips. The scanning control unit 605 is typically implemented with gate control chips available from the display industry. The multiplexer 610 is used to reduce the number of connections from the amplifiers, and to reduce the number of ADC channels. To handle the large amount of data sampled from the photosensor array 600 quickly, the memory is typically included in processor 660. In an aspect of the disclosure, a host computer 650 (e.g., another processor) is coupled to the processor 660 via an interface. The host computer 650 receives digital pixel information from the memory buffer and can produce a visual representation of the image on a display (not shown).

The scanning control unit 605 may turn the switching elements 608 on and off sequentially one row at a time. Other elements of the imaging system are well known to those in the art.

The processor 660 is typically physically integrated with the flat panel detector and may be electronically integrated with gate control chips, amplifier chips, a buffer memory, and an interface to a host computer 650. The chips are typically implemented as application specific integrated circuits (ASICs) which in turn may each handle hundreds of data channels.

The host computer 650 may be a microcontroller or microprocessor or any other processing hardware such as a CPU or GPU. The memory (not shown) may be separate from the processor (as or integrated in the same). For example, the microcontroller or microprocessor includes at least one data storage device, such as, but not limited to, RAM, ROM and persistent storage. In an aspect of the disclosure, the processor may be configured to execute one or more programs stored in a computer readable storage device.

In aspects of the disclosure, the photosensor array 600 may be deposited directly onto the surface of the scintillating glass-ceramic conversion layer 405, which would then also serve to take the place of the usual glass substrate layer. This would in turn enable the use of BI (back illuminated) x-ray imaging, in which the x-rays would be incident from the bottom as shown in FIG. 4b. This would result in a sharper image at the same dose as in the prior art FI (front illuminated) system, or a low dose image at the same sharpness.

Figure 5:
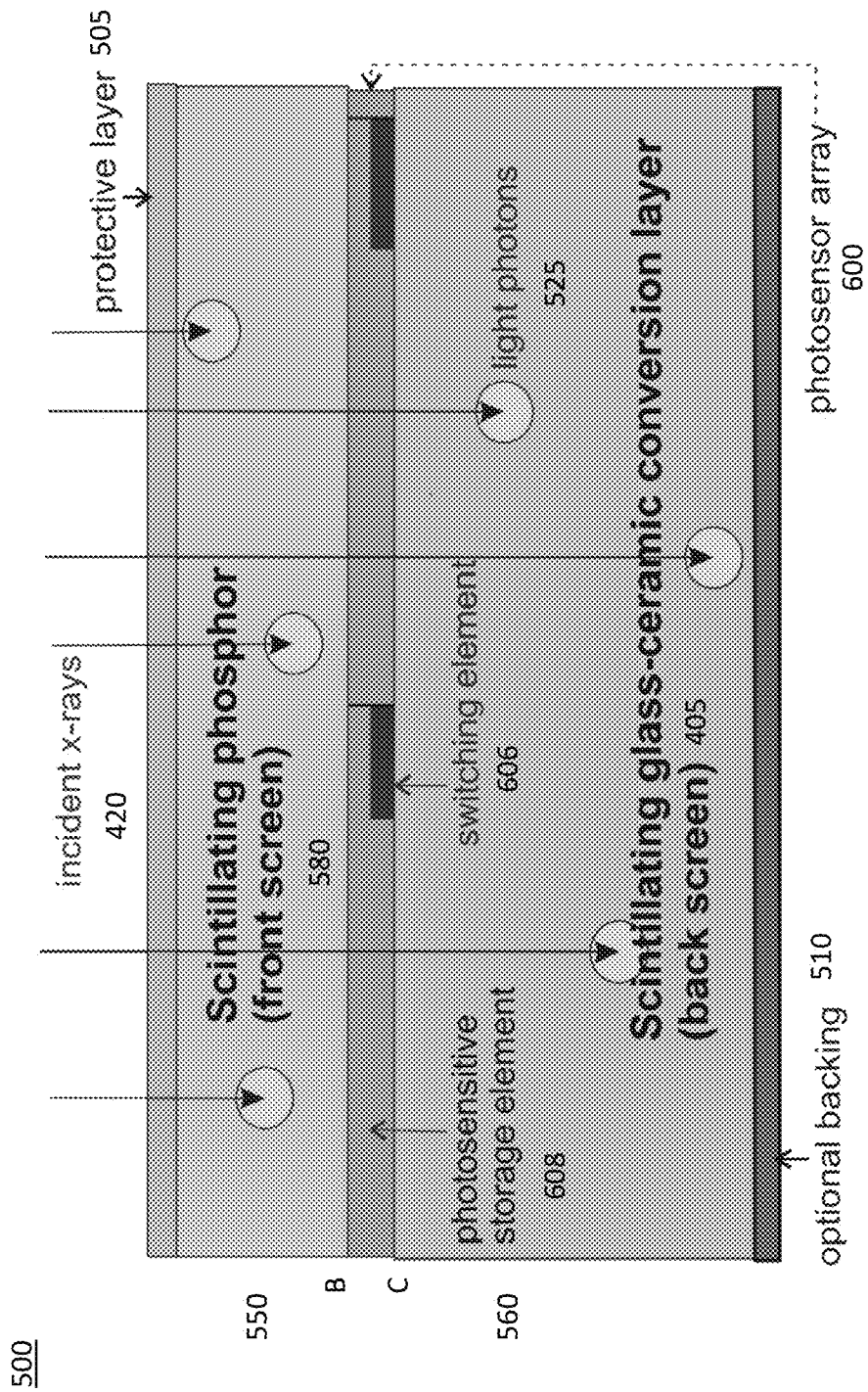
FIG. 5 is a schematic cross-sectional view of a dual-screen structure having a scintillating glass-ceramic conversion layer used in a dual-screen sandwich detector configuration in accordance with aspects of the disclosure.

FIG. 5 shows an example of a Flat Panel Imager (FPD) 500 (another example of a structure) having any of the scintillating glass ceramics 1 as a conversion layer 405 in a dual screen configuration. Advantageously, the scintillating glass-ceramic conversion layer 405 is used both as a light detector and a substrate for the photosensor array 600. This removes the need for a separate (non-scintillating) glass substrate layer, as in a known FPD (removing a source of a loss of sharpness due to light spreading within the substrate between the screen and the photosensor array and other deleterious light piping effects). Further, this arrangement improves the spatial resolution over a single screen of the same total thickness, because the two screens sandwich the photosensor array and the average distance from an absorption event to the array is lessened, thus minimizing the effect of light scatter. The combined thickness of the two screens may also be made thicker than that of the single screen while maintaining spatial resolution, resulting in a detector requiring less dose. In addition, more light photons from the scintillating glass ceramic 1 will reach the photosensor array 600, due to the elimination of any absorption in a separate substrate layer.

The FPD 500 may be used in an imaging system in a similar manner as described above (FIG. 6). The FPD 500 may include two screens 550, 560 (front screen 550 and back screen 560). In FI mode, the front screen 550 may be closest to the radiation source of the two screens. The photosensor array 600 may be disposed between the front screen 550 and the back screen 560. The front screen 550 has a surface B facing the photosensor array 600. The back screen 560 has a surface C facing the photosensor array 600.

The front screen 550 may comprise a scintillating phosphor layer 580 or material. For example, the front screen 550 may include phosphor crystals that may capture the incident x-rays 420 and convert the captured x-rays into light photons 525 (only one representation in FIG. 5 is labeled for simplifying the figure). In some examples, the screen 550 may be a powder or granular type (e.g., $GdO_2S_2$:Tb, $CaWO_4$, BaFCl:Eu). In other examples, the screen 550 may be comprised of nanometer-sized particles such as quantum dots, rather than the micron sized particles typical of "standard" screens such as $GdO_2S_2$:Tb. In still other examples, the scintillating material may be of the perovskite type. The front screen 550 may emit light photons (e.g., photon bursts) in the visual light region.

In other aspects of the disclosure, the front screen 550 may comprise a structured scintillating layer. For example, the front screen 550 may include scintillating phosphor needle structures that may capture the incident x-rays 420 and convert the captured x-rays into light photons 525. In some examples, the front screen 550 may be a vacuum deposited needle structure composed of CsI:Tl. Where CsI:

Tl is used, the front screen 550 may emit light in about 550 nm region. In other aspects of the disclosure, a liquid scintillating material may be used. In some examples, a combination of different types of scintillating materials and types may be used.

The screens 550, 560 may have different thicknesses. As shown in FIG. 5, the back screen 560 is thicker than the front screen 550. This is to allow the thinner front screen to capture fine details in the incoming spatial pattern of x-rays, while the thicker back screen compensates for the fact that some of the incoming x-ray flux is then not captured by the front screen 550. The thicker the front screen 550 is, less incident x-rays 420 arrive in the back screen 560. Thus, the thickness of each screen may be determined based on certain performance needs, which include signal-to-noise ratio and may be based on a particular application that the FPD 500 is used for.

The surface C of the scintillating glass-ceramic conversion layer 405 is smooth. The surface C has a smoothness that meets a standard required for a substrate for electronic components. For example, the smoothness may be about 1 nm RMS. In other aspects of the disclosure, the smoothness may be about 1-about 5 nm RMS. In yet other aspects of the disclosure, the smoothness may be about 5 nm-about 20 nm RMS. One or both screens 550, 560 may include an optional backing layer 510 (backing layer is not shown for the front screen). However, the backing layer 510 may provide support for the scintillation portion of the front screen 550. Additionally, the backing layer(s) 510 may have optical characteristic(s) at the wavelengths of the light photons created in the screen(s) which improve imaging performance for particular applications (absorptive or reflective). For example, the optical reflectance of the backing may be very high to maximize imaging signal-to-noise ratio, or low to maximize imaging spatial resolution. For example, in an aspect of the disclosure, the diffuse optical reflectance of the backing 510 may be very high (above about 90%) to maximize imaging signal-to-noise ratio, or low (below about 10%) if the objective is to maximize imaging spatial resolution.

In some aspects, a backing layer 510 may be omitted from the back screen 560. The front screen 550 may also include a protective layer 505, if needed. For example, the protective layer 505 may be a plastic film.

The incident x-rays 420 may not be fully captured by the front screen 550 (scintillating front screen) because the material may not have the enough thickness to absorb all of the incident x-rays. The uncaptured (and not converted) x-rays may pass through the front screen 550 and the photosensor array 600 and reach the scintillating glass-ceramic conversion layer 405. Thus, in accordance with aspects of the disclosure, the scintillating glass-ceramic conversion layer 405 facilitates the photosensor array 600 to utilize extra photons derived from the x-rays that would not or could not be converted by the front screen 550. In the dual screen configuration, the photosensor array 600 is configured to convert photons from both screens 550, 560 into electrical signals. The vertical line extending from a respective switching element 606 represents a boundary of a pixel.

FIG. 7 shows an example of a Flat Panel Imager (FPD) 700 (another example of a structure) having any of the scintillating glass ceramics 1 as a conversion layer 405 for high energy photons. In this aspect of the disclosure, the FPD 700 also has a build-up layer 705. The photosensor array 600 is disposed on a surface of the scintillating glass-ceramic conversion layer 405 opposite to the incident x-rays or gamma rays 420A. The build-up layer 705 is disposed on the surface of the scintillating glass-ceramic conversion layer 405 near the incident x-rays or gamma rays 420A.

The build-up layer 705 may increase the sensitivity by providing forward-scattered photons and electrons 710 (only one representation of the electrons is labeled to simplify the figure) upon its interaction with the high-energy beam. The scattered photons and electrons 710 enter the scintillating glass-ceramic conversion layer 405 and deposit their energy to produce light as image signal. In some aspects, the build-up layer 705 may be, but is not limited to, copper, brass, lead, or leaded glass.

Here the incident x-rays 420A may have energies in the 0.3-20 MeV range, as characteristic of portal imaging in the practice of radiation oncology. Advantageously, the photosensor array 600 may be deposited directly onto the surface of the scintillating glass-ceramic conversion layer 405.

In some aspects of the disclosure, scintillating glass ceramic 1 may be incorporated into a screen of a FPD for applications requiring higher-energy x-ray beams such as cone beam computed tomography, where existing detectors have relatively poor performance. In other aspects, the scintillating glass ceramic 1 may be used in other clinical applications including image-guided surgery, and general radiology.

Testing

Scintillating glass ceramics were fabricated. The ceramics had an oxyhalide matrix, $Tb^3$ luminescent centers, $BaCl_2$ light scattering centers, and the sensitizer $Gd^{3+}$. The inventors realized that oxyhalide glass systems have many favorable properties, including low phonon energy for increased scintillation efficiency and the ability to host a large percentage of rare earth elements. Trivalent terbium is a bright scintillator with a favorable emission spectrum that is well-suited for the photosensitive storage element in FPDs. Though primarily used as light scattering centers, $BaCl_2$ is also a scintillator and adds to the brightness of the material. Gadolinium is a sensitizer and increases the x-ray absorption of the glass ceramic via higher atomic number (high-Z) and increased density.

The scintillating glass ceramics were made by mixing powders to achieve a composition in mole percentage of the form $(52-x)B_2O_3-5SiO_2-10BaCl_2-10GdF_3-xTb_2O_3-23Li_2O$, where x is 0, 2, 4, 6, and 8. The composition is one way to have $Tb^{3+}$ in the ceramics; however there are different compositions which also achieve the same, such as substituting $TbF_3$, $Tb_4O_7$, $ThO_2$, and/or $Tb_6O_{11}$ for $Tb_2O_3$.

The powders were heated to a temperature of 1000° C., creating a molten glass. The temperature of the molten glass was reduced to 975° C. before being poured into a brass mold at 400° C.; the temperature reduction to 975° C. is a fining step to reduce bubbles in the material and may not be necessary, depending upon the composition and other factors.

$BaCl_2$ crystals spontaneously precipitated within the glass matrix, forming a glass ceramic material, as the material cooled at a rate of approximately 1.5° C. per minute to room temperature. The entire process occurred in an argon atmosphere; however certain compositions such as those with all-oxides starting materials, may not require an inert atmosphere. For other compositions, a separate heat treatment step, also known as ceramming, may be necessary to precipitate the crystals.

The powders were dried before the melting process; however, depending upon the hygroscopicity of the powders, a drying step may not be required. The scintillating glass ceramics were annealed for internal stress reduction, as it slowly cooled to room temperature; annealing could also occur as a separate step.

The scintillating glass ceramics were formed within a brass mold, with the final shape and surface finish determined by sectioning and polishing of the materials. Other methods for forming the scintillating glass ceramics exist, such as rolling and pressing. Annealing can occur after these forming processes to relieve internal stress.

There are alternative methods for creating scintillating glass ceramics, such as powder processing. With powder processing glass frit are sintered, then partially crystallized.

Additionally, other ceramic processing techniques can employed in their manufacture including, but not limited to the following: spraying, tape- and slip-casting, isostatic pressing, or extrusion. In other aspects, the glass ceramics may also be obtained through sol-gel routes.

X-ray diffraction measurement of the as-made glass and heat-treated samples (glass ceramics) was performed on a Philips X'Pert MRD X-ray Diffractometer (PANalytical Inc., Westborough, MA, USA) in the 2θ range from 20° to 80° (2θ) is on the x-axis. Scanning rate step size was 0.050 with a time step of either 10 or 30 seconds.

Figure 8:
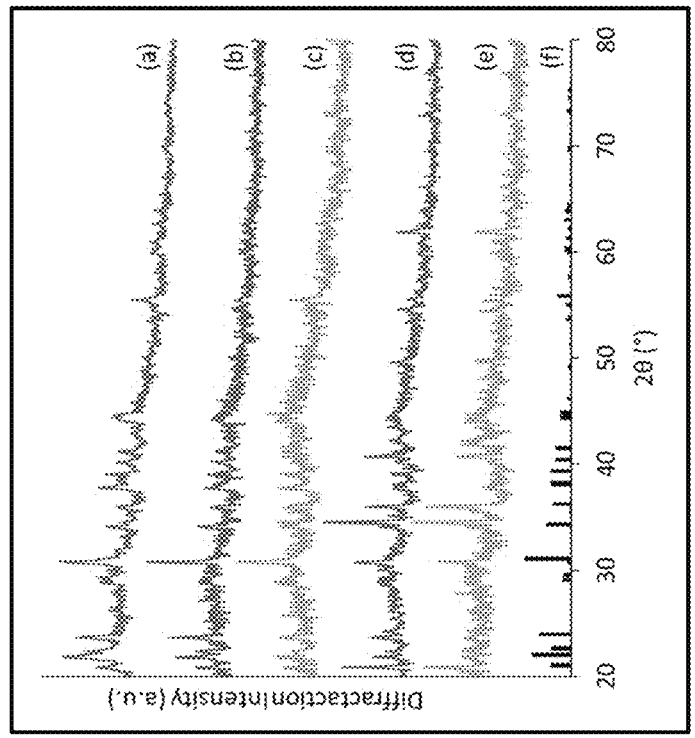

X-ray diffraction (XRD) experiments confirmed the presence of $BaCl_2$ crystallites in the scintillating glass ceramics as shown in FIG. 8. FIG. 8 shows the diffraction patterns (intensities) for the scintillating glass ceramics made as described above, with 5 different percentages of $Tb_2O_3$ where (a) is 0% $Tb_2O_3$, (b) is 2% $Tb_2O_3$, (c) is 4% $Tb_2O_3$, (d) is 6% $Tb_2O_3$, and (e) is 8% $Tb_2O_3$. The pattern for orthorhombic $BaCl_2$ (PDF #00-024-0094) is shown for comparison (f). The powder diffraction file was obtained from the Information Center for Diffraction Data. As shown in FIG. 8, the diffraction peaks associated with orthorhombic $BaCl_2$ pattern (f) can be clearly seen in the diffraction patterns (a)-(e). For example, there is a reasonable match at the more prominent peaks, such as at 22.0°, 23.9°, 31.0°, and 34.2°.

Figure 9:
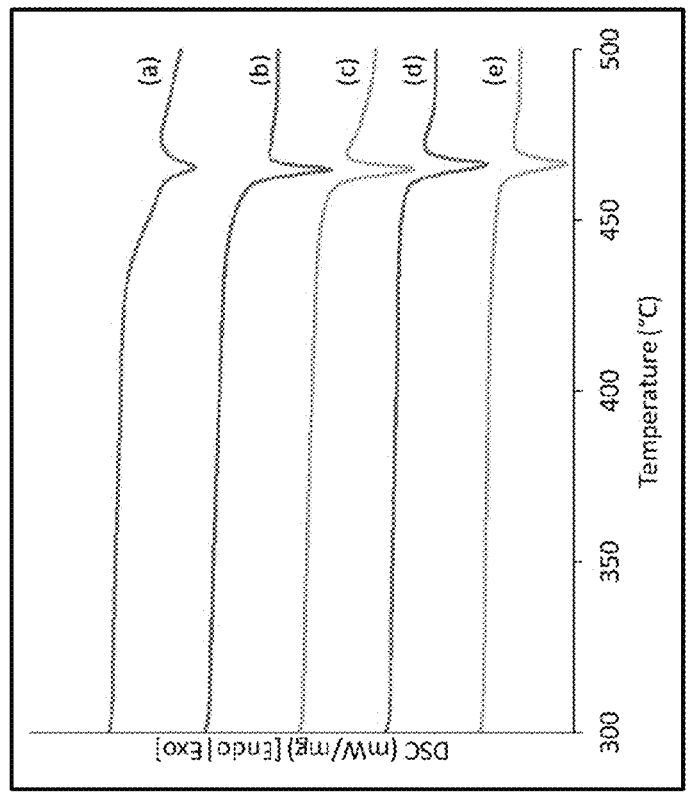
FIGS. 8-15 illustrate graphs of test results of scintillating glass ceramics in accordance with aspects of the disclosure.

Differential scanning calorimetry (DSC) (Netzsch DSC 200 F3) scans were made for each as-made sample from 300° C. to 590° C. at rates of 10 K per minute. As shown in FIG. 9, the scans confirm that the samples, e.g., the scintillating glass ceramics, contained an amorphous (glassy) phase. This is demonstrated by the presence of a glass transition temperature between 430 and 455° C. for all samples (temperature in which the scan curve or reduce). FIG. 9 shows the scans for the scintillating glass ceramics made as described above, with 5 different percentages of $Tb_2O_3$ where (a) is 0% $Tb_2O_3$, (b) is 2% $Tb_2O_3$, (c) is 4% $Tb_2O_3$, (d) is 6% $Tb_2O_3$, and (e) is 8% $Tb_2O_3$.

The DSC results also demonstrated the necessary thermal stability of the materials, as there are no thermal events that occur until the glass transition temperature is reached; the maximum processing temperature for a-Si:H TFT arrays can be as low as 300° C. The scans are relatively flat until the glass transition temperature.

Figure 11:
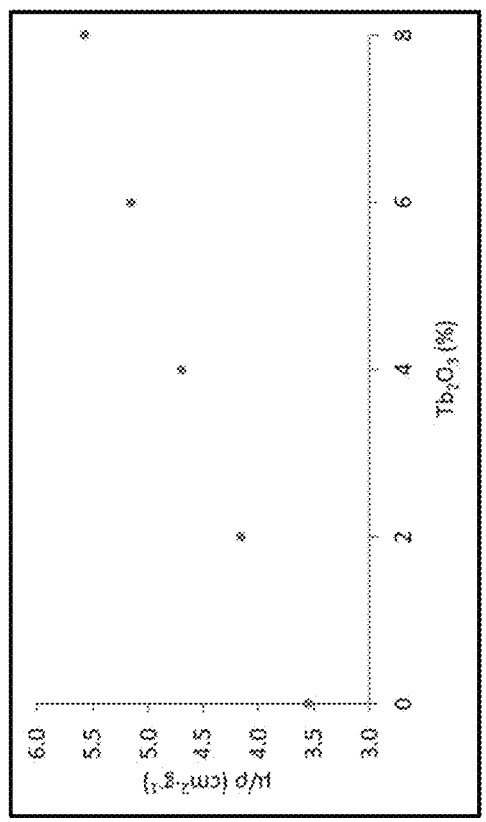
Figure 10:
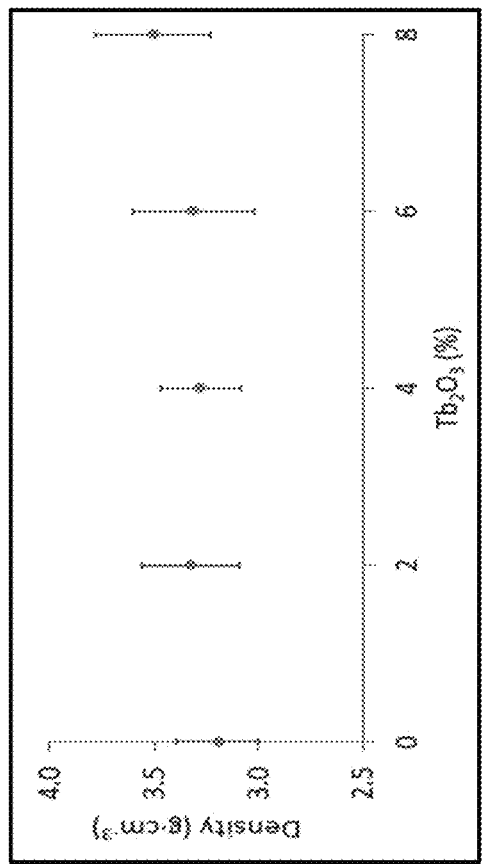

FIG. 10 shows the densities of the scintillating glass ceramics for the five different $Tb_2O_3$ percentages, e.g., density as a function of $Tb_2O_3$ content. The densities were calculated from measured mass and volume. The differences in densities are slight, being within experimental uncertainty, with the density measuring between 3.2 and 3.5 $g \cdot cm^{-3}$ for all samples. These densities (as shown in FIG. 10) combined with the x-ray attenuation properties of the constituent elements give the materials suitable x-ray mass attenuation coefficients (as shown in FIG. 11), so that functional scintillators can be produced with practical dimensions. FIG. 11 shows the calculated x-ray mass attenuation coefficient for each sample, e.g., scintillating glass ceramics, as a function of $Tb_2O_3$ content at 60 keV energy. The bars represent the experimental uncertainly in the density determination.

X-ray attenuation by the samples for a given energy were determined by their densities and x-ray mass attenuation coefficients. The transmission of x-rays through a material may be described by the exponential attenuation law:

$$\frac{1}{I_o} = e^{\{-(\frac{\mu}{\rho})x\}} \quad (2)$$

where $I_o$ is the incident intensity of a beam of monoenergetic photons, I is the transmitted intensity, $\mu/\rho$ is the x-ray mass attenuation coefficient, and x is the mass thickness. The mass thickness x is defined as the mass per unit area:

$$x = \rho t \quad (3)$$

where ρ is the density of the material and t is its thickness. Greater values of density and the mass attenuation coefficient lead to increased x-ray attenuation.

Figure 12:
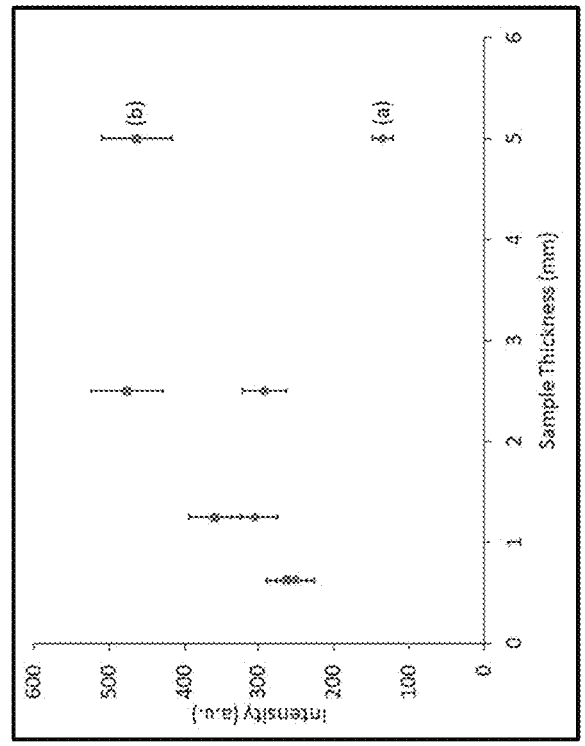

FIG. 12 shows the calculated attenuation of each nominal composition versus thickness based upon an assumed density of 3.3 $g \cdot cm^{-3}$ and 60 keV x-rays where (a) is 0% $Tb_2O_3$, (b) is 2% $Tb_2O_3$, (c) is 4% $Tb_2O_3$, (d) is 6% $Tb_2O_3$, and (e) is 8% $Tb_2O_3$. At thicknesses of roughly 5 mm or more, the total attenuation approaches 100% for all samples with 60 keV x-ray radiation as shown in FIG. 12.

At a thickness of roughly 2 mm, the total attenuation is close to or above 90%. FIG. 12 demonstrates that the ceramics may be used for the FPD in different thicknesses while still achieving a high total attenuation. The thickness may be such that the FPD may be compact but at the same time, still thick enough to meet the mechanical requirements for being a substrate for the photosensor array 600. For example, the ceramic may be at least about 0.5 mm. In other aspects, the ceramic may be at least about 0.7 mm. The thickness may be such that a signal-to-noise ratio is maximized.

X-ray scintillation output was measured with a specially modified x-ray flat panel detector, in which the housing of a commercial indirect FPD (AXS-2430FDi, Analogic Canada Corporation) was modified so that the scintillating glass ceramics could be pressed into direct contact with the photosensitive array (TFT and photodiode array layer). Further, the modified x-ray flat panel detector could be rotated such that the incident x-ray beam would enter first through the scintillating glass ceramics ("front-irradiated") or first through the TFT/photodiode readout ("back-irradiated").

Figure 13:
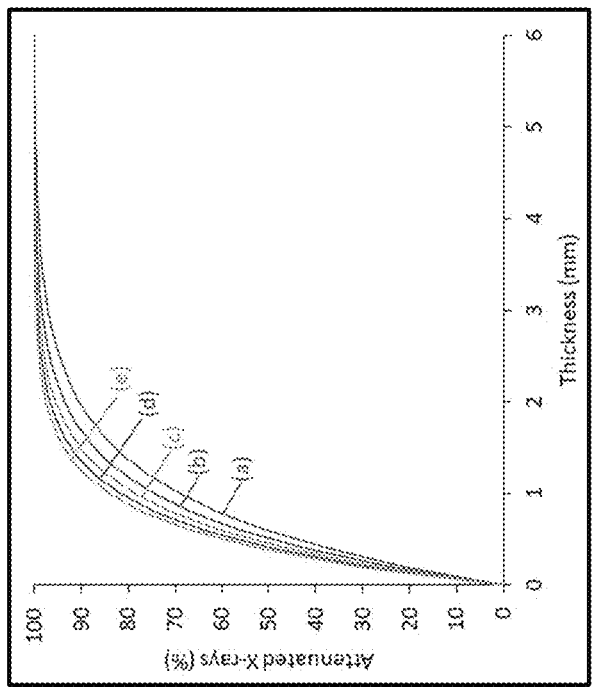

The sample (scintillating glass ceramic) with the composition $50B_2O_3$-$5SiO_2$-$10BaCl_2$-$10GdF_3$-$2Tb_2O_3$-$23Li_2O$ was divided then ground to several different thicknesses using sandpaper. Samples in this series were ground to 5.00, 2.50, 1.25, and 0.63±0.10 mm. The samples are shown to have the necessary properties to withstand the forces required to shape and polish them and can exist as freestanding structures with thicknesses as little as 0.63±0.10 mm. The samples maintained their integrity while be characterized, which demonstrates their mechanical robustness and chemical stability. FIG. 13 shows the intensity, e.g., x-ray scintillation output for scintillating glass ceramics of various thicknesses in the (a) front- and (b) back-irradiated configuration. Each sample (scintillating glass ceramic) contains 2% $Tb_2O_3$. The circle is for the front irradiated and the square is for the back irradiated. FIG. 13 also shows that the scintillating glass ceramics have the ability to be formed to various shapes and their necessary mechanical robustness. The intensity is in arbitrary units. The bars represent the experimental uncertainty in the intensity determination. The output signal rises initially with thickness because of the increase in x-ray absorption, and then levels off or actually decreases (especially in the case of FI). The decrease is indicative of a decrease in light escape efficiency with depth in the material, due to the light absorption.

Figure 14:
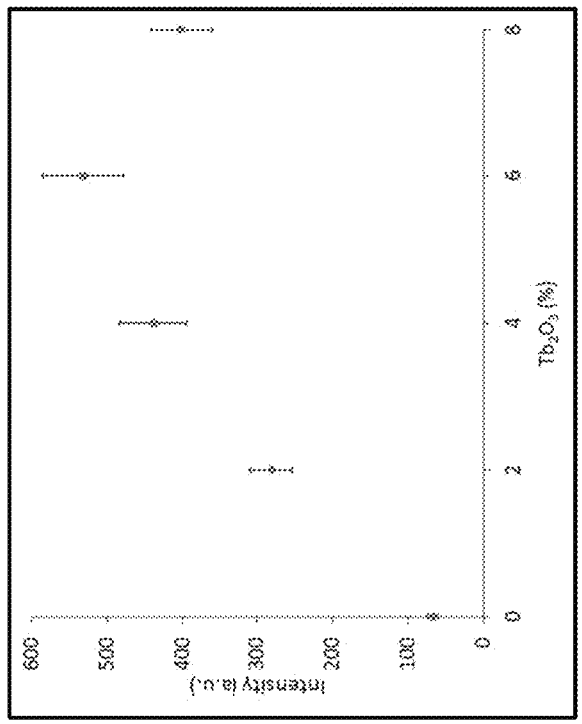

Scintillating glass ceramics have tunable properties which are composition dependent. As shown in FIG. 14, the amount of dopant, $Tb^3$, added to the composition (e.g., in the form of $Tb_2O_3$) can have great effect on the scintillation performance of the materials. The dopant may be added in other ways. FIG. 14 depicts the x-ray scintillation output for the scintillating glass ceramics with varying amounts of $Tb_2O_3$. The thickness of each sample was 5.0 mm. The measurements were made in the back-irradiated configuration. As can be seen, the scintillating glass ceramic having 6% $Tb_2O_3$ had the highest output of the five different samples. The intensity is in arbitrary units. The bars represent the experimental uncertainty in the intensity determination.

X-ray excited emission spectra were measured with a custom setup in which a sample was placed at the input port of a 76.2 mm integrating sphere (Labsphere, Inc.) and irradiated using a tungsten anode x-ray tube producing a standard RQA9 beam quality (120 kVp tube voltage, 40 mm Al filtration). The resultant x-ray luminescent light was directed to a CCD-type optical spectrometer (Spectral Products SM242, Putnam, CT). The integration time was 35 ms.

Figure 15:
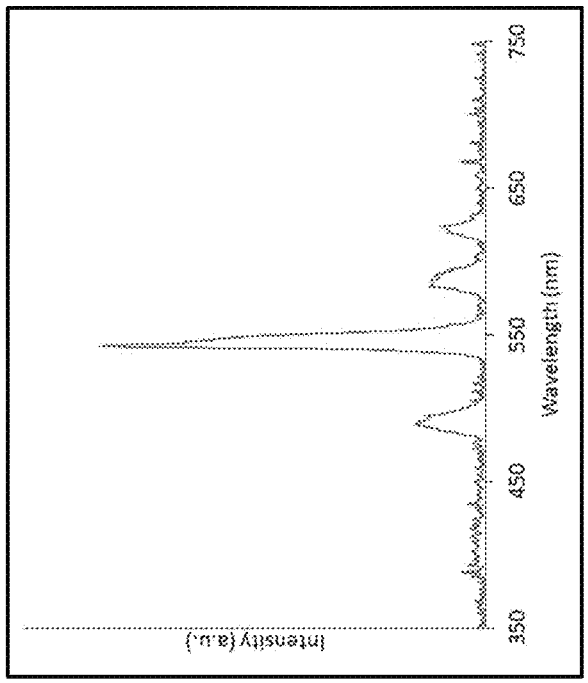

FIG. 15 shows the x-ray excited emission spectrum of a sample of a scintillating glass ceramic containing 2% $Tb_2O_3$ Emission from $Tb^3$ dominates the spectrum; peaks attributed to $Tb^{3+}$, centered at approximately 490 ($^5D_4\rightarrow{}^7F_6$), 545 ($^5D_4\rightarrow{}^7F_5$), and 590 nm ($^5D_4\rightarrow{}^7F_4$) are seen. The green emission of $Tb^{3+}$ is a good match to the quantum efficiency curve of a known amorphous silicon detector. The emission from $BaCl_2$ centered at approximately 402 nm is very small in comparison, though it still makes a contribution to the overall signal.

Thin Film (Coatings)

In other aspects of the disclosure, a scintillating (or scintillator) thin film may be coated or deposited onto a glass substrate. In some aspects of the disclosure, the scintillating thin film may be composed of similar components described above including luminescent centers and light scattering centers and a glass matrix as a scintillating glass ceramic. The film may also be comprised of one or more sensitizers.

The thin film can be synthesized via a variety of thin film deposition methods including, but not limited to, chemical vapor deposition, physical vapor deposition, conversion coating, ion beam deposition, spraying, or physical coating processes (spin and dip coating).

Figure 17:
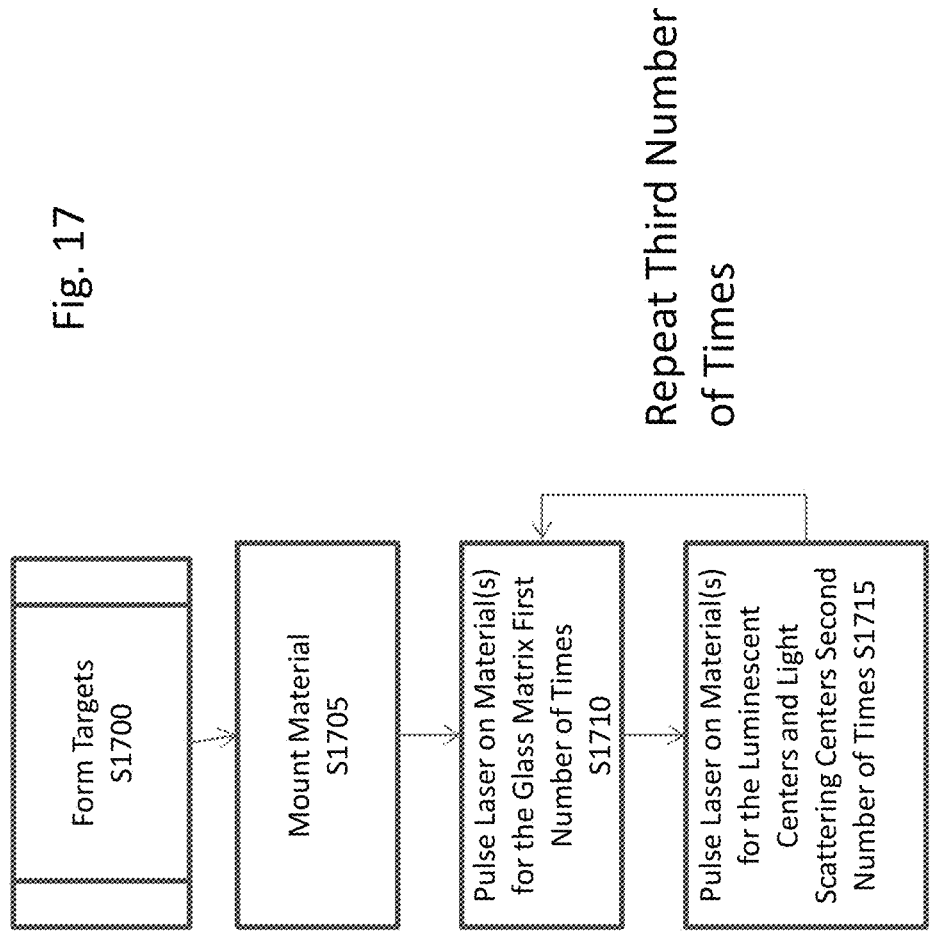
FIG. 17 illustrates a flow chart for forming a scintillating thin film on a glass substrate in accordance with aspects of the disclosure.

FIG. 17 illustrates one example of a method for fabricating the thin film in accordance with aspects of the disclosure. At S1700, the targets for deposition are formed. The targets include the materials necessary for depositing a film consisting of the luminescent centers, light scattering centers and a glass matrix. The targets may also contain materials to allow the deposition of a sensitizer. The luminescent centers can be elements, ions, or compounds. In some aspects, the luminescent centers may be crystals such as halides (cesium iodide and barium chloride), silicates (gadolinium orthosilicate and lutetium-yttrium oxyorthosilicate), or sulfides (gadolinium oxysulfide); other crystalline materials may also be used. These luminescent centers may further include one or more of europium, cesium, terbium, thallium, or other dopants to increase scintillation performance (ions thereof). Crystalline materials may also serve as light scattering centers. In other aspects, additional materials may also serve as light scattering centers.

In an aspect of the disclosure, the scintillating (or scintillator) thin film 1805 is thermally stable in the region necessary for TFT deposition and can be synthesized as a flat, continuous layer.

At S1705, the materials necessary for depositing luminescent centers, light scattering centers and a glass matrix are mounted to a rotating target holder(s). The rotating target holder(s) is placed in a deposition chamber with the deposition substrate(s), e.g., glass substrate. The deposition chamber is kept below about $10^{-5}$ Torr. However, the pressure may be altered for different compositions. At S1710, a laser is pulsed on the material(s) used for the glass matrix. The energy of the laser may depend on the material used for the glass matrix. The laser is pulsed for a first number of times. The first number of times may depend on the thickness of the film and the target material used. At S1715, the laser is pulsed on the material(s) for the luminescent centers and light scattering centers (and sensitizers, if included). The energy of the laser may be the same. In other aspects, the energy may be different depending on the materials used. The laser is pulsed for a second number of times. The second number of times may depend on the thickness of the film and the materials used. S1710 and S1715 are repeated a third number of times. Once again, the third number of times may depend on the thickness of the layer and materials used.

In accordance with aspects of the disclosure, the use of the scintillating (or scintillator) thin film (as a coating) provides an opportunity to utilize certain scintillating materials that may not be applicable with bulk glass ceramics synthesized via traditional methods, such as, melt-quench or powder processing. The bulk synthesis method must use materials that are compatible with the glass matrix and may significantly limit the scintillator to glass ratio. However, the scintillating (or scintillator) thin film (as a coating) shown in FIGS. 19a, 19b and 20 demonstrates the ability to synthesize a glass-ceramic film, with a high scintillator to glass ratio, using luminescent centers and light scattering centers materials formed into an ablation target. Pulsed laser deposition (PLD) ablates a target material(s) and directs it towards a substrate. The luminescent centers, light scattering centers and glass matrix material(s) are ablated and directed toward a substrate to result in a physically combined glass ceramic.

The above described thin film may be incorporated into a screen of a FPD. When incorporated into a FPD for detecting x-rays, the coating thickness (film thickness) can be increased for increased x-ray absorption and improved scintillation yield. The luminescent center to glass matrix ratio can also be increased to improve scintillation yield. In some aspects, the FPD may have one screen or dual screens.

Figure 18:
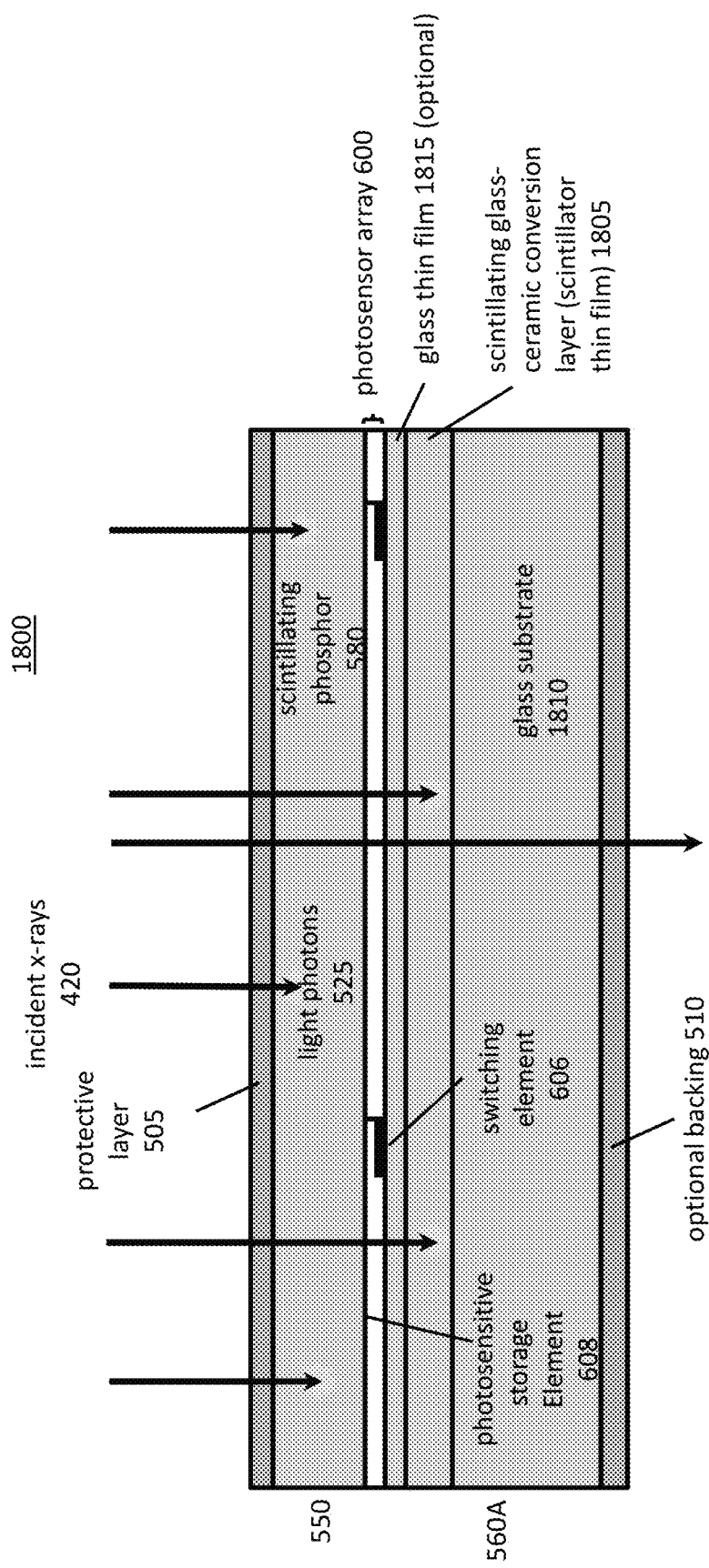
FIG. 18 illustrates a schematic cross-sectional view of a structure having a scintillating conversion layer used in a dual-screen sandwich detector configuration, in which the scintillating conversion layer is coated onto a glass substrate, in accordance with aspects of the disclosure.

FIG. 18 illustrates an example of a FPD 1800 (another example of a structure) in a dual screen configuration where the back screen 560A comprises a scintillating glass-ceramic conversion layer (scintillator thin film) 1805 coated onto a glass substrate 1810. The scintillator thin film 1805 may be coated on the glass substrate 1810 in the manner described in FIG. 17. However other methods of coating a scintillator thin film may be used. FIG. 18 also depicts an optional glass thin film 1815, which serves as a substrate for the photosensor array 600. This has the advantage that the thin glass substrate layer may be chosen to have the physical properties necessary to be compatible with existing electronic manufacturing facilities for photosensor arrays 600. The optional glass thin film 1815 may be fabricated by using pulses of laser on a material deposited as glass. The optional glass thin film 1815 may be thin to reduce the light spreading within, which increases spatial resolution. The number of pulses and energy of the laser may depend on the material and thickness. The optional glass thin film 1815 is thermally stable in the region necessary for TFT deposition and can be synthesized as a flat, continuous layer.

In some aspects of the disclosure, scintillator thin film 1805 may be incorporated into a screen of a FPD for applications requiring higher-energy x-ray beams such as cone beam computed tomography, where existing detectors have relatively poor performance. In other aspects, the scintillator thin film 1805 may be used in other clinical applications including image-guided surgery and general radiology.

Example Fabrication

Prototypes have been developed, consisting of $BaCl_2$:$Eu^{2+}$, which serves as both luminescent and scattering centers and an amorphous Si matrix deposited onto a $SiO_2$ glass substrate via pulsed laser deposition. An excimer laser was used to ablate a target of pressed $BaCl_2$:$Eu^{2+}$ powders to create the scintillating and scattering centers and a Si target to create the glass matrix. The target materials are fixed to a target holder and the laser alternates pulses on each material to synthesize the glass-ceramic film. The matrix was deposited first using 1000 laser pulses on a Si target, followed by 5000 laser pulses on the $BaCl_2$:$Eu^{2+}$ target. This sequence was repeated for a total of 500 cycles. The glass-ceramic thin film was then capped with an optional glass protective layer, resulting from 1000 laser pulses on the Si target.

Figure 19:
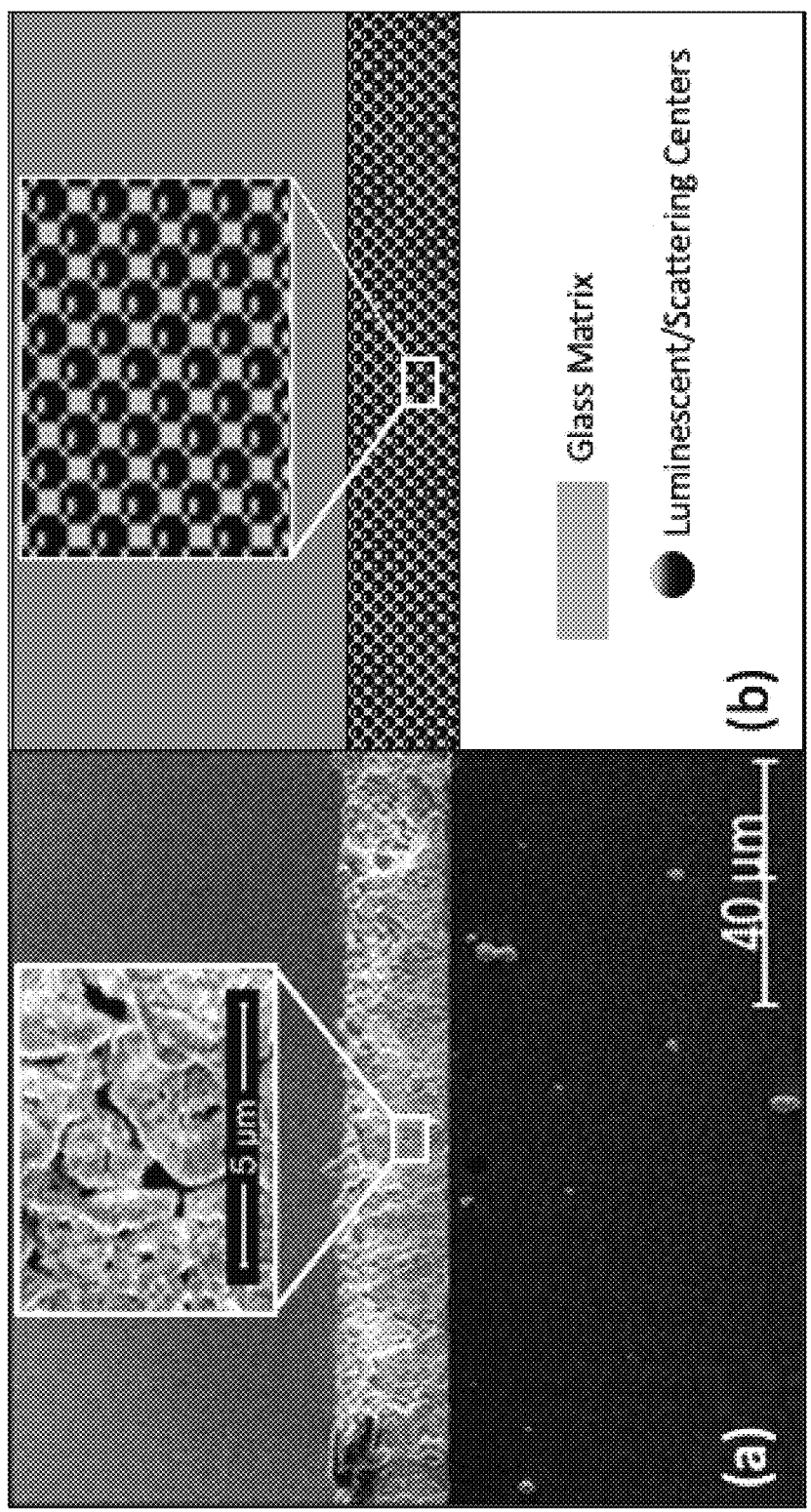
FIG. 19a shows an SEM cross-sectional image of an example of a scintillator thin film and FIG. 19b illustrates a cross-section of an example of a scintillator thin film.

FIG. 19*a* shows an SEM-cross section image of the $BaCl_2$:$Eu^{2+}$ film within an amorphous Si matrix as fabricated in accordance with the above description. A higher magnification image of the film is inset. FIG. 19*b* is an illustration showing different portions of the film in the SEM image.

Figure 20:
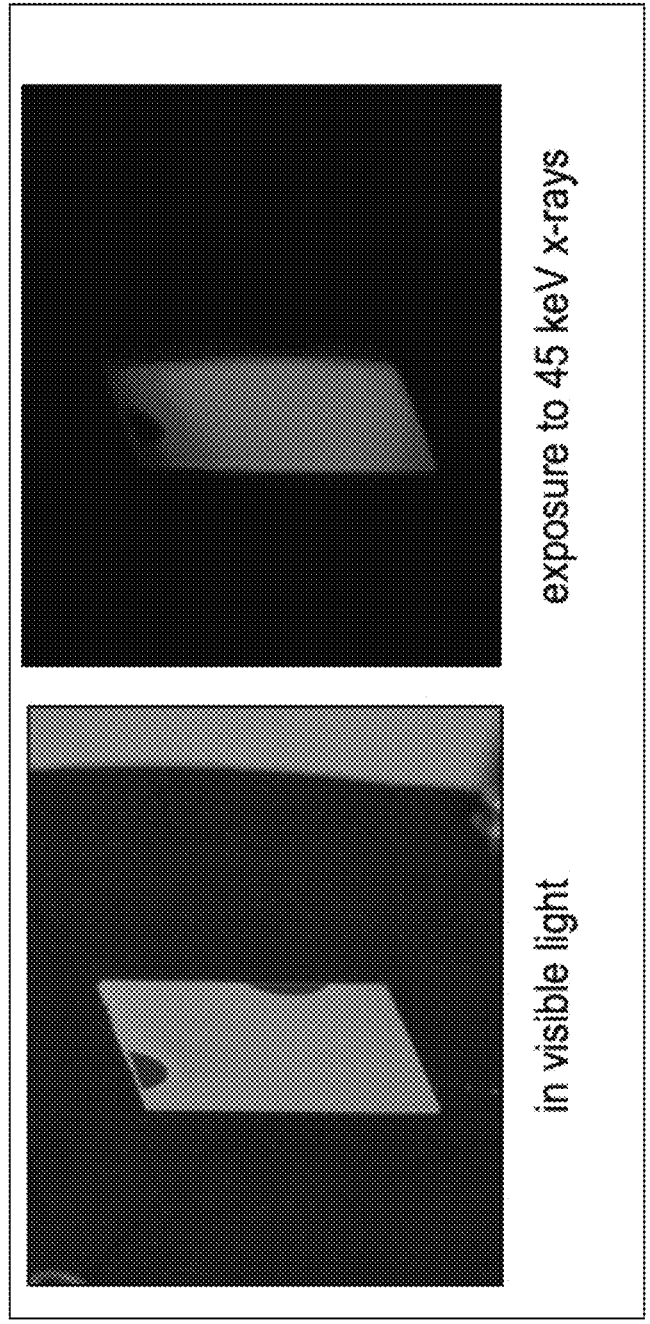
FIG. 20 illustrates an example of the scintillating thin film coated onto the thin glass substrate in accordance with aspects of the disclosure in visible light and exposure to 45 keV x-rays.

FIG. 20 illustrates the $BaCl_2$:$Eu^{2+}$ film within an amorphous borosilicate matrix exposed to visible light and 45 keV x-rays. As can be seen, when exposed to x-rays, the film scintillates which will yield a measurable signal detectable by TFT/photodiode array and thus may be used for imaging. The two semi-circular shapes are uncoated portions of the glass substrate created by masking the substrate during the deposition process.

In the description, the term "about" indicates that the value listed may be somewhat altered, as long as the alteration does not result in nonconformance of the process or structure to the illustrated disclosure. For example, for some elements the term "about" can refer to a variation of ±0.1%, for other elements, the term "about" can refer to a variation of 1%, ±10% or ±20%, or any point therein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A structure comprising:
a photosensor array; and
a screen comprising a scintillating glass ceramic, the scintillating glass ceramic comprising a glass matrix hosting luminescent centers and light scattering centers, the scintillating glass ceramic configured to convert incident x-ray radiation into light photons, where a surface of the scintillating glass ceramic faces the photosensor array, wherein the photosensor array is operable to capture at least a portion of the light photons from the screen and convert the captured light photons into electrical signals.

2. The structure of claim 1, wherein the scintillating glass ceramic is a substrate for the photosensor array.

3. The structure of claim 1, wherein the scintillating glass ceramic is configured to convert incident x-ray radiation incident on a surface of the scintillating glass ceramic opposite the surface facing the photosensor array.

4. The structure of claim 1, wherein the light scattering centers or the luminescent centers or both the light scattering centers and the luminescent centers include crystals, the light scattering centers and the luminescent centers have different compositions.

5. The structure of claim 4, wherein the crystals of the luminescent centers are doped with an activator.

6. The structure of claim 1, wherein the luminescent centers include one or more materials selected from a group consisting of ions from the first and second row of transition metals, rare earth metals, actinides and $ns^2$ type activators.

7. The structure of claim 6, wherein the luminescent centers are $Th^{3+}$ and the scintillating glass ceramic comprises $Tb_2O_3$.

8. The structure of claim 7, wherein a mole percentage of the $Tb_2O_3$ is about 6%.

9. The structure of claim 1, wherein the crystals are halide crystals.

10. The structure of claim 5, wherein the scintillating glass ceramic further comprises sensitizers configured to absorb the incident x-ray radiation and transfer energy to the activator.

11. The structure of claim 10, wherein the sensitizers are one or more materials selected from a group consisting of $ns^2$ type and lanthanide ions.

12. The structure of claim 11, wherein the ions are $Gd^{3+}$ and/or $Ce^{3+}$.

13. The structure of claim 1, wherein the glass matrix is an oxyhalide matrix.

14. The structure of claim 1, further comprising a build-up layer positioned on a surface of the scintillating glass ceramic opposite the surface facing the photosensor array.

15. The structure of claim 14, wherein the build-up layer comprises a material selected from a group consisting of copper, brass, lead and leaded glass.

16. An imaging system comprising:
a processor configured to be in communication with the structure according to claim 1, wherein the photosensor array is configured to produce an image having a plurality of pixels,
wherein the processor is configured to:
receive the electrical signals from the structure; and
produce the image having the plurality of pixels using the electrical signals.

17. A structure comprising:
a first scintillating screen that converts an absorbed portion of incident radiation directed at the structure into light photons;
a photosensor array; and
a second scintillating screen comprising a scintillating glass ceramic, the photosensor array being between the first scintillating screen and the second scintillating screen,
the scintillating glass ceramic comprising a glass matrix hosting luminescent centers and light scattering centers, the scintillating glass ceramic is configured to convert at least a portion of the incident radiation transmitted through the first scintillating screen and the photosensor array into light photons,
wherein the photosensor array is operable to capture at least a portion of the light photons from the first scintillating screen and the second scintillating screen and convert the captured light photons into electrical signals.

18. The structure of claim 17, wherein the second scintillating screen further comprises a backing, the backing contacting another surface of the scintillating glass ceramic, the another surface being opposite of a surface facing the photosensor array, and the backing is absorptive or reflective to the light photons.

19. The structure of claim 17, wherein the scintillating glass ceramic is a substrate for the photosensor array.

20. The structure of claim 17, wherein the light scattering centers or the luminescent centers or both the light scatting centers and the luminescent centers include crystals, wherein the light scattering centers and the luminescent centers have different compositions.

21. The structure of claim 20, wherein the crystals are doped with an activator.

22. The structure of claim 17, wherein the luminescent centers include one or more materials selected from a group consisting of ions from first and second row of transition metals, rare earth metals, actinides and $ns^2$ type activators.

23. The structure of claim 22, wherein the luminescent centers are $Th^{3+}$ and the scintillating glass ceramic comprises $Tb_2O_3$.

24. The structure of claim 23, wherein a mole percentage of the $Tb_2O_3$ is about 6%.

25. The structure of claim 21, wherein the scintillating glass ceramic further comprises sensitizers configured to absorb the incident radiation and transfer energy to the activator.

26. The structure of claim 25, wherein the sensitizers is are one or more materials selected from a group consisting of $ns^2$ type and lanthanide ions.

27. The structure of claim 17, wherein the scintillating glass ceramic is greater than about 0.5 mm thick.

28. An imaging system comprising:
a processor configured to be in communication with the structure according to claim 17, wherein the photosensor array is configured to produce an image having a plurality of pixels,
wherein the processor is configured to:
receive the electrical signals from the structure; and
produce the image having the plurality of pixels using the electrical signals.

29. A scintillating glass ceramic for x-ray conversion comprising:
a glass matrix hosting luminescent centers, light scattering centers, and one or more high-Z elements.

30. The scintillating glass ceramic for x-ray conversion according to claim 29, wherein the light scattering centers have a size greater than about 10 nm.

31. The scintillating glass ceramic for x-ray conversion according to claim 29, wherein a concentration of light scattering centers in the glass matrix is such that a scattering length is greater than about 1 µm.

32. The scintillating glass ceramic for x-ray conversion according to claim 29, wherein the ceramic has a density greater than about $3.0$ g $cm^{31\ 3}$.

33. The scintillating glass ceramic for x-ray conversion according to claim 29, wherein photon emissions are in a wavelength range from about 375 nm to about 650 nm.

34. The scintillating glass ceramic for x-ray conversion according to claim 29, wherein the one or more high-Z elements are sensitizers.

35. The scintillating glass ceramic for x-ray conversion according to claim 34, wherein the sensitizers are one or more materials selected from a group consisting of $ns^2$ type and lanthanide ions.

36. A structure comprising:
a first scintillating screen that converts an absorbed portion of incident radiation directed at the structure into light photons;
a photosensor array; and
a second scintillating screen comprising a scintillating glass ceramic and a glass substrate, the scintillating glass ceramic being a coating on the glass substrate, the photosensor array being between the first scintillating screen and the second scintillating screen,
the scintillating glass ceramic comprising a glass matrix hosting luminescent centers and light scattering centers, the scintillating glass ceramic is configured to convert at least a portion of the incident radiation transmitted through the first scintillating screen and the photosensor array into light photons,
wherein the photosensor array is operable to capture at least a portion of the light photons from the first scintillating screen and the second scintillating screen and convert the captured light photons into electrical signals.

37. The structure of claim 36, further comprises a glass film coated on the scintillating glass ceramic.

38. The structure of claim 37, wherein the glass film is a substrate for the photosensor array.

39. An imaging system comprising:
a processor configured to be in communication with the structure according to claim 36, wherein the photosensor array is configured to produce an image having a plurality of pixels, wherein the processor is configured to:
receive the electrical signals from the structure; and
produce the image having the plurality of pixels using the electrical signals.

40. The structure of claim 1, wherein the light scattering centers are $BaCL_2$, and wherein a mole percentage of the $BaCL_2$ is about 10%.

* * * * *